United States Patent [19]

Rechtschaffen et al.

[11] Patent Number: 5,408,658
[45] Date of Patent: Apr. 18, 1995

[54] SELF-SCHEDULING PARALLEL COMPUTER SYSTEM AND METHOD

[75] Inventors: Rudolph N. Rechtschaffen, Scarsdale; Kattamuri Ekanadham, Yorktown Heights, both of N.Y.

[73] Assignee: International Business Machines Corporation, Armonk, N.Y.

[21] Appl. No.: 730,365

[22] Filed: Jul. 15, 1991

[51] Int. Cl.$^6$ ............................ G06F 9/38; G06F 15/16
[52] U.S. Cl. .............................. 395/650; 364/DIG. 1;
364/230; 364/230.3; 364/281.5; 364/281.7;
364/228.1; 395/375
[58] Field of Search .......................................... 395/650

[56] References Cited

U.S. PATENT DOCUMENTS

| | | | |
|---|---|---|---|
| 4,484,272 | 11/1984 | Green | 364/DIG. 1 |
| 4,903,196 | 4/1990 | Pomerene et al. | 1/1 |
| 5,021,945 | 6/1991 | Morrison et al. | 364/DIG. 1 |

FOREIGN PATENT DOCUMENTS 0243892 4/1987 European Pat. Off. .

OTHER PUBLICATIONS

Science, vol. 253, No. 5025, Sep. 13, 1991, Washington, D.C. US, J. A. Fisher et al., "Instruction-level Parallel Processing", p. 1238, left column, paragraph 3, paragraph 8.

*Primary Examiner*—Eddie P. Chan
*Attorney, Agent, or Firm*—Ronald L. Drumheller

[57] ABSTRACT

An incremental method is described for distributing the instructions of an execution sequence among a plurality of processing elements for execution in parallel. The distribution is based upon anticipated availability times of the needed input values for each instruction as well as the anticipated availability times of each processing element for handling each instruction. A self-parallelizing computer system and method are also described for asynchronously processing the distributed instructions in two modes of execution on a set of processing elements which communicate with each other.

4 Claims, 15 Drawing Sheets

SELF-SCHEDULING PARALLEL COMPUTER SYSTEM AND METHOD

BACKGROUND OF THE INVENTION

1. Field of the Invention

This invention generally relates to an incremental method of distributing the instructions of an execution sequence among a plurality of processing elements for execution in parallel. More particularly it relates to such a method in which the distribution is based upon the anticipated availability times of the needed input values for each instruction as well as the anticipated availability times of each processing element for handling each instruction. This invention also relates to a computer system and method in which execution sequences of instructions are executed in two modes of execution, the first mode being used not only to execute instructions but also simultaneously to parallelize instruction sequences which have not already been parallelized, while the second mode is used to execute in parallel, on separate processing elements, instruction sequences which have been already parallelized.

2. Description of the Prior Art

One way of executing a digital computer program faster is to execute several of its parts in parallel on separate processors. One way of doing this is to define a programming environment and computer system so that programs can be written for execution in such a parallel fashion. Unfortunately, many useful programs have been created already in which sequential execution of the instructions has been assumed. It is desirable to be able to execute these sequential programs faster also, so some effort has been made in the prior art to parallelize such programs for execution in parallel.

Most of the prior work in this area relies on creating a parallel specification of the program. This has been accomplished in several ways. Sophisticated compilers have been created which parallelize programs and generate code for a multi-processor system having a number of conventional processors. Some of these compilers uncover the parallelism automatically (e.g., "Advanced Compiler Optimizations for Supercomputers" by D. A. Padua and M. J. Wolfe in Comm. of ACM, Vol. 29, page 12 et seq., December 1986). Others take cues from programmer-supplied annotations (e.g., "Programming for Parallelism" by Alan H. Karp in Computer, Vol. 20, Page 5 et seq., May 1987). Another approach is to create specialized hardware that is amenable for parallel execution, such as vector processors, vliw architectures, etc. Here again a compiler translates sequential programs into code suitable for use on these machines. The compiling effort in these cases is substantial. A more radical approach has been to create an inherently parallel execution mechanism, such as a dataflow machine (See "Dataflow Supercomputers" by J. B. Dennis in Computer, Vol. 13, page 11 et seq., November 1980), and a declarative specification for a program which automatically generates parallel code for use on that mechanism (See "Future Scientific Programming on Parallel Machines" by Arvind and K. Ekanadham in the Jour. of Parallel & Distributed Computing, Vol. 5, December 1988).

In all of the foregoing approaches, the task of parallelizing the computer program and determining that it is safe to execute different parts in parallel is done either at the compiler level or even earlier at the programming level (i.e., ahead of any actual productive execution of the code with data). The processors play no role in determining whether it is safe to execute different parts in parallel at execution time because this determination has been made already by either the programmer or the compiler.

Another approach brings unparallelized code to a multi-processor system itself at execution time and gives the multi-processor system an active role in splitting up the code for parallel execution and in determining whether the parallel execution of the code is valid. This approach may be distinguished from the others in that execution of at least some of the instructions is done provisionally. It is not generally known ahead of execution whether the parallel execution is totally valid. A mechanism is provided for determining whether the parts executed in parallel are valid and if not the invalid parts are executed again.

This approach is exemplified in a patent application Ser. No. 342,494 entitle "Multiple Sequence Processor System" filed on Apr. 24, 1989, now abandoned by the assignee of this patent application, in which instructions are divided into groups in accordance with some delimiting rule and then at least two groups are executed in parallel. One of the groups of instructions is sequentially earlier than all of the others and a correct execution of the earliest group is assumed, while the later groups are only provisionally executed in parallel. Later groups of instructions read data from registers and memory locations just as if earlier groups of instructions have already been executed. Controls monitor whether any data used by a later group of instructions is changed (after it has been used by the later group) by instructions in an earlier group. Stores to memory locations and registers by the later groups are done only temporarily in a separate place. If all of the data used by a later group is valid (i.e. not changed by an earlier group), the results of that later group are valid and can become committed. If not, that later group is re-executed.

In U.S. Pat. No. 4,825,360 a similar scheme is used in that instruction groups are being provisionally executed in parallel and then confirmed in sequence. However, in this scheme the chances for success have been enhanced through a compilation step and through a reduction (and preferable elimination) in side effecting instructions other than as the final instruction in a group. As a consequence, it is not clear that this system can be used to parallelize conventional sequential code.

In U.S. Pat. No. 4,903,196 (Pomerene et al.), a uniprocessor parallelizes code for execution on separate asynchronous execution units and the execution units wait for each other, if necessary, to avoid using data which will be modified by instructions earlier in conceptual order until those instructions have been executed. There is only one set of general purpose registers (GPRs) and only one decoder. A series of special purpose tags are associated with each GPR and execution unit in the uniprocessor. The tags allow the multiple execution units to be concurrently executing multiple instructions using the GPRs sequentially or different GPRs concurrently while at the same time preserving the logical integrity of the data supplied by the GPRs to the execution units. The tags associated with each GPR and each execution unit store a sequence trail between the individual GPRs and execution units so that before a given execution unit is permitted to store into a particular GPR, the immediately preceding store into that particular GPR by a different execution unit must have been completed. Also, the tags assure that all reads from a given GPR by one or more execution units are completed before a subsequent store operation to that GPR is allowed to occur.

SUMMARY OF THE INVENTION

It is an object of this invention to execute several portions of a computer program in parallel, while giving the appearance that the program has been executed sequentially.

Another object is to asynchronously execute several portions of a computer program in parallel while communicating operands correctly from each computer program portion producing an operand to the computer program portion(s) needing that operand.

Still another object is to execute a computer program in two modes of execution, the first mode being a sequential mode in which the system not only executes an instruction sequence but also "learns" how to execute that same instruction sequence in a second mode of execution which utilizes parallel processing, the second mode of execution being used thereafter as much as possible for executing that instruction sequence.

It is also an object to provide an improved method and apparatus for partitioning instructions in an execution instruction sequence for parallel execution.

A further object is to partition instructions so as to minimize the amount of time that each instruction must wait for needed input values before decoding and/or execution of that instruction can be accomplished.

Still another object is to partition instructions so as to minimize the amount of time that each instruction must wait for decoding and/or execution after needed input values are available.

These and further objects and features are accomplished in accordance with this invention by providing an improved method of distributing the instructions of an execution sequence among a plurality of processing elements for execution in parallel. A pseudo-schedule of the instructions is created having the same number of partitions as the number of processing elements, each of the instructions being assigned to a particular partition of the pseudo-schedule. Each of the instructions is assigned a particular decode time based upon the anticipated availability times of needed input values for that instruction. Each instruction receives a partition assignment based not only upon the decode time assigned to that instruction but also the assigned decode times of all prior instructions in the execution sequence (all prior instructions in the execution sequence being assigned a decode time and partition ahead of any later instructions in the execution sequence). The instructions assigned to the same partition are then distributed to the same processing element for execution, but without any of said decode times used to form the pseudo-schedule.

In the preferred embodiment of this invention, the instructions are distributed among a plurality of processing elements for execution by a computer system and method which is generally described and claimed in a separate patent application Ser. No. 07/731,224 entitled "SELF-PARALLELIZING COMPUTER SYSTEM AND METHOD" by the same inventors as this patent application and filed on the same date as this patent application. Accordingly, this co-pending application is hereby fully incorporated by reference and major portions thereof have been included herein verbatim.

Said co-pending application describes a self-parallelizing computer system and method in which a single execution sequence of instructions is executed in successive segments and each segment is further partitioned into a group of instruction subsequences, each instruction subsequence being executed on a different one of a set of separate processing elements. This machine and method has been named MSIS (Multi-streaming a Single Instruction Sequence).

The processing elements store the necessary information in association with the instructions to allow them to execute asynchronously on the separate processing elements and to allow communication between processing elements so that the result of a parallel execution is correct. As such, a single instruction stream is dynamically parallelized relative to the execution of branches within that stream, which distinguishes it from other forms of parallel execution.

MSIS is a uniprocessor organization in which a set of processing elements working in concert execute successive segments of the instruction stream. Each processing element is capable of decoding instructions, generating memory operand addresses, executing instructions and referencing and updating its own set of general purpose registers. These processing elements act in concert during the first execution of a program segment to create separate instruction streams or instruction subsequences from the original segment and to store them. These separate instruction subsequences corresponding to a segment are a parallelized form of the original segment and are called Z-Code. This is a true partitioning in the sense that each instruction from the original segment is placed in only one of the created subsequences in the parallelized Z-Code form. Subsequent re-execution of the same program segment is much faster, since each of the processing elements decodes and executes only the instructions which have been assigned to it during the first execution of that segment and the other processing elements are concurrently doing the same for their own assigned instructions.

Segments are either P-Segments or Z-Segments. A P-Segment is a sequence of consecutively executed instructions (i.e., a normal segment of a uniprocessor instruction stream), which is processed in a first mode of execution (called "E-Mode") with data to produce not only the usual results of execution with data but also to produce one or more Z-Segments. If a program segment is executed again when the corresponding Z-Segment is available, the Z-Segment is processed by MSIS in place of the P-Segment in a second mode of execution (called "Z-Mode").

The main difference between E-Mode and Z-Mode is that during E-Mode all processing elements see all instructions in the P-Segments but only execute the instructions assigned to them. During Z-Mode each processing element not only executes only the instructions assigned to it but also only sees and decodes those instructions.

Since all processing elements see all instructions in E-Mode, this mode of processing makes all instruction interdependencies manifest to all processing elements and each records the information (as "Z-Code") it will require to execute properly in Z-Mode autonomously and asynchronously with respect to all the other processing elements. The Z-Code captures the interdependencies on an instruction by instruction basis for all instructions in a P-Segment.

In the Z-Mode, certain instructions executed on a processing element become the producers of register values that may be used by conceptually later consumer instructions executed on a different processing element. To assure sequential correctness from the perspective of the original instruction stream, MSIS creates producer-consumer synchronization by sending and awaiting messages. Whether an instruction is a producer, consumer, both, or neither is recorded in the Z-Code and used in the Z-Mode. To do this, the Z-Code associates with each instruction an S-List and a D-List.

An S-List instructs the processing element in the Z-Mode, that one or more of the source registers for an instruction are set by another instruction executing on another processing element. The D-List instructs the processing element in the Z-mode as to the names of the other processing elements that require the values of the register(s) that are set by an instruction. Correct execution in the Z-Mode occurs because each processing element knows from the Z-Code what information it needs from other processing elements to execute a particular instruction and if that information has not been sent to the processing element ahead of the execution of that instruction, the processing element waits for the needed information to be sent to it by the other processing elements before executing that particular instruction. Each processing element also knows from the Z-Code which information generated by that processing element will be needed by other processing elements to execute instructions, and the information required by other processing elements is sent to them by this processing element when the information is produced.

Segments in MSIS are further broken down into levels of conditionality. The level of conditionality of an instruction is the number of branch instructions that precede it in the segment. The level of conditionality starts at zero and is incremented following each branch instruction. The maximum number of levels of conditionality per segment is limited by the hardware resources in MSIS and a P-Segment in MSIS is terminated in the E-Mode before this limit is reached.

MSIS is a two pass system generates Z-Code (during the first pass through an instruction sequence) which preserves the dependency between instructions that have been scheduled on different processors. The Z-Code enables the instruction sequence to re-execute correctly (in a second pass) with different data. Correct execution is accomplished by sending and anticipating messages that coordinate the setting and use of registers in the different processing elements. The need for these messages was determined during the E-Mode first pass execution and captured in the Z-Code.

Inherently the Z-Code which results from an E-Mode execution of a P-Segment depends upon the specific branch decisions (if any) which were made during the E-Mode execution of that instruction sequence (i.e., segment). Z-Code is recorded during an E-Mode execution in anticipation that the same instruction sequence might be totally or partially executed again and in such event that the Z-Code might be used in place of the original code (which is sometimes herein referred to as "E-Code") to execute the same instruction sequence again, at least in part, much more quickly in the parallelized Z-Mode of execution. Since computer programs tend to execute the same instruction sequences many times and branch instructions tend to be decided the same way on successive executions of the same branch, many instruction sequences (i.e., segments) are re-executed again and the branch instructions in re-executed instruction sequences are frequently decided the same way again upon re-execution, which is why performance is improved very much by creating Z-Code and executing it in place of E-Code whenever possible.

This patent application is specifically concerned with the manner in which individual instructions are assigned to processing elements. The different ways that such an assignment can be made will be described more fully in Sections 7 and 9 which follow, but as an outline:

The assignment can be determined by an external agent which associates with each instruction, I, in a P-Segment, a value, $\phi(i)$, that specifies the processing element that is to execute the instruction I.

Each processing element can calculate $\phi(i)$ based on information associated with the P-Segment up to instruction I. As all processing elements do the same thing they will all agree on the assignment made for each instruction.

The recovery procedures (Section 6), the means of managing the memory (Section 5), and the avoidance of deadlock in message handling (Section 4), require only that the assignment of instructions preserves the conceptual order of instructions within a processing element.

The overall desiderata of MSIS assignment is to minimize the holes in the schedule of instructions. Holes are created by instruction interdependencies and it is the elimination of holes that creates the best schedule. In this application is described a set of schedule oriented assignments that we call "Monotonic Finite Incremental Assignments".

Our preferred Monotonic Finite Incremental Assignment technique is described in detail in Sections 7 and 8 and we have called this preferred technique "Min-Slot Min-Time" (MSMT). Other assignment scheme variations are described in Section 9 and include what we have called "Min-Slot Min-P" and "Min-Slot Min-Contour".

BRIEF DESCRIPTION OF THE DRAWINGS

The foregoing and other objects, aspects and advantages of the invention will be better understood from the following detailed description, which refers to the drawings, in which.

DETAILED DESCRIPTION OF A PREFERRED EMBODIMENT

The following description of the preferred embodiment of MSIS will be subdivided into 9 Sections, each principally referencing one or more figures having the same first number as the Section describing it. The description consists of the following Sections:

Section 1 OVERVIEW OF THE INVENTION
Section 2 PRIVATE Z-CACHES
Section 3 SEPARATE REGISTER FILES
Section 4 MESSAGE PASSING BETWEEN PROCESSING ELEMENTS
Section 5 MONITORING FOR OPERAND STORE COMPARE
Section 6 HANDLING BRANCHES
Section 7 ASSIGNMENT OF INSTRUCTIONS TO PROCESSING ELEMENTS IN E-MODE
Section 8 INSTRUCTION PROCESSING DURING E-MODE AND DURING Z-MODE
Section 9 EXTENSIONS TO THE BASIC EMBODIMENT

SECTION 1 OVERVIEW OF THE INVENTION

Figure 1A:
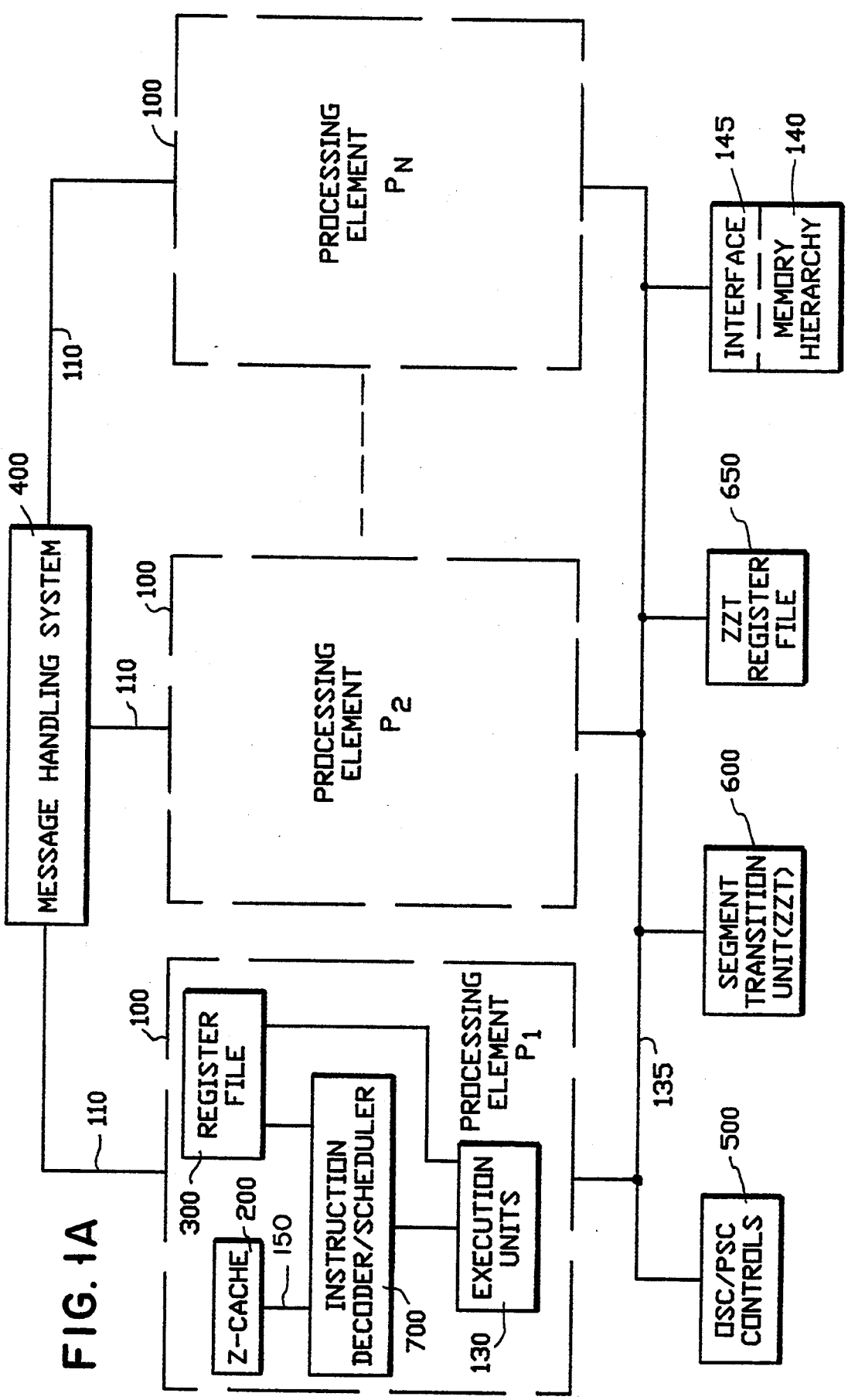
FIG. 1A is a block diagram of a preferred embodiment of a self-parallelizing processing system in accordance with this invention.

A block diagram of the MSIS processor organization is shown in FIG. 1A. Each Processing Element 100 is capable of decoding instructions using an Instruction Decoder/Scheduler 700, accessing its own Register File 300 to generate addresses for memory operands and to access register operands. These operands are sent to the Execution Units 130 within the Processing Elements, which perform the operations specified by the instruction and put away the results of the executions.

The Processing Elements in MSIS are identical with the exception that each Processing Element has a prespecified Identification Number (1,2, in a system with n Processing Elements). This Name of a Processing Element is known to the Processing Element and during the E-Mode, for example, it allows the Processing Element to determine if the instruction that it is decoding is assigned to it. Each Processing Element is connected via a Bus 135 to a Memory Hierarchy 140 which supplies data operands on fetch operations, receives store operands on store operations, and is used for instruction fetching during the E-Mode. The actual fetching and storing of operands is done through a set of OSC/PSC Controls 500 which assure that all hazards associated with out-of-sequence operations are detected.

A Segment Transition Unit 600 (hereafter often called the ZZT, an acronym for Z-Code to Z-Code Transition) stores information which facilitates branch recovery. It also uses information in a ZZT RFILE 650, which stores the values of registers needed in order to m transition into a Z-Code segment. Both the ZZT and ZZT RFILE are accessed via Bus 135.

Each Processing Element can communicate with any other Processing Element via a Message Handling System 400.

Each Processing Element has its own private Z-Cache 200 which stores annotated instructions for the Z-Mode of operation. Instruction fetching during the Z-Mode uses uses a dedicated Bus 150 within each Processing Element.

Figure 1B:
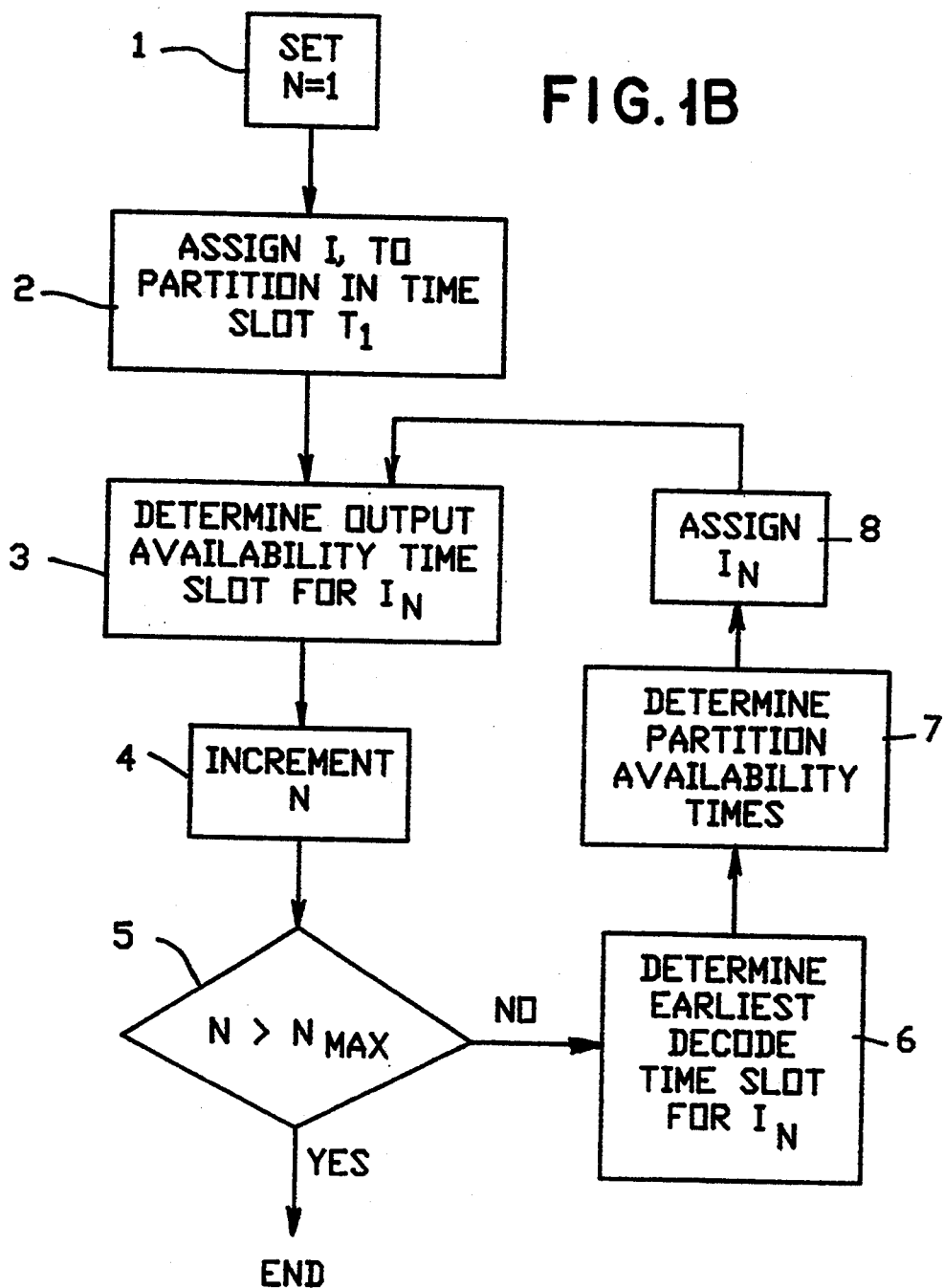
FIG. 1B is a flow diagram of a method of distributing the instructions of an execution sequence among a plurality of processing elements in accordance with this invention.

This invention particularly pertains to the Decoder/Scheduler 700 and the manner in which the Scheduler portion thereof is implemented. A flow diagram of the method implemented by the Scheduler is shown in FIG. 1B. The flow diagram assumes that Instructions $I_n$ will be scheduled with N increasing from 1 to $N_{max}$. N is initialized to 1 in Step 1. In Step 2 an arbitrary first assignment of $I_1$ is made in Time Slot $T_1$ to one of the partitions. In Step 3 the Time Slot is determined at which the outputs will be available from the Instruction previously assigned (i.e., Instruction $I_1$ initially). Then N is incremented in Step 4. A determination is made in Step 5 as to whether or not the assignments have all been made. If N has reached $N_{max}$, the assignment process is ended. Otherwise, in Step 6 the earliest Time Slot is determined at which all of the outputs will be available which are needed by the current Instruction to be assigned. In Step 7 the earliest available Time Slot in each partition is determined (with skipped over Time Slots not being available). In Step 8 the current Instruction $I_N$ is assigned using some algorithm which takes into account the Time Slots determined in Steps 6 and 7. Then Steps 3,4 and 5 are repeated. If N has not reached $N_{max}$ in Step 5, the process Steps 6,7,8,3,4 and 5 are further repeated until N reaches $N_{max}$.

Figure 1C:
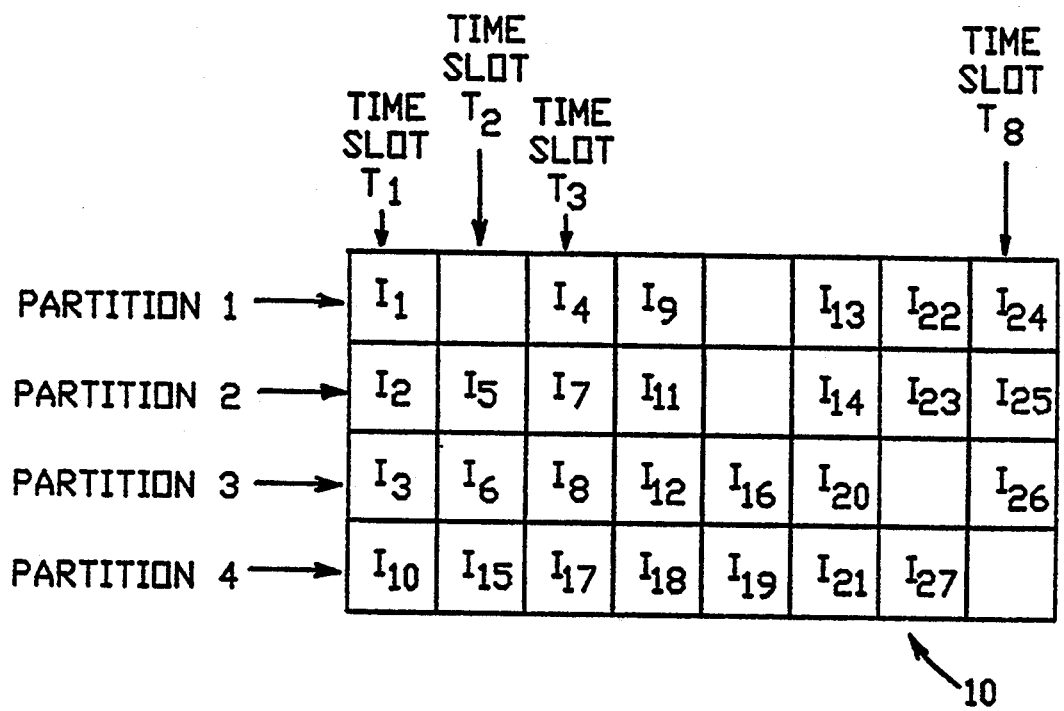
FIG. 1C illustrates a Pseudo-Schedule produced by the method illustrated in FIG. 1B.

FIG. 1C illustrates a Pseudo-Schedule 10 produced from the flow process just described. Pseudo-Schedule 10 has four partitions by way of example and shows an illustrative assignment of 27 instructions $I_1$ through $I_{27}$ utilizing 8 Time Slots $T_1$ through $T_8$. It should be noted that four holes in the Pseudo-Schedule have been created so far where no instruction has been scheduled. The unscheduled Time Slot $T_8$ may or may not become a hole depending upon future assignments of further Instructions. The hole at $T_2$ occurred because the inputs for Instruction $I_4$ were determined to be not available until Time Slot $T_3$ and none of the partitions had been filled yet through $T_2$ at that point. Partition 4 did not get an assignment until $I_{10}$ because all previous opportunities for assigning to Partition 4 would have created a large hole because of needed inputs for the previous Instructions. $I_{10}$ and $I_{15}$ did not require any inputs from previous Instructions in this sequence, so they could be assigned to Partition 4 without creating a hole. It was in anticipation that such Instructions might occur that decision was made to schedule the earlier Instructions on the other Partitions. The aim is to minimize the total number of holes being created.

Figure 1D:
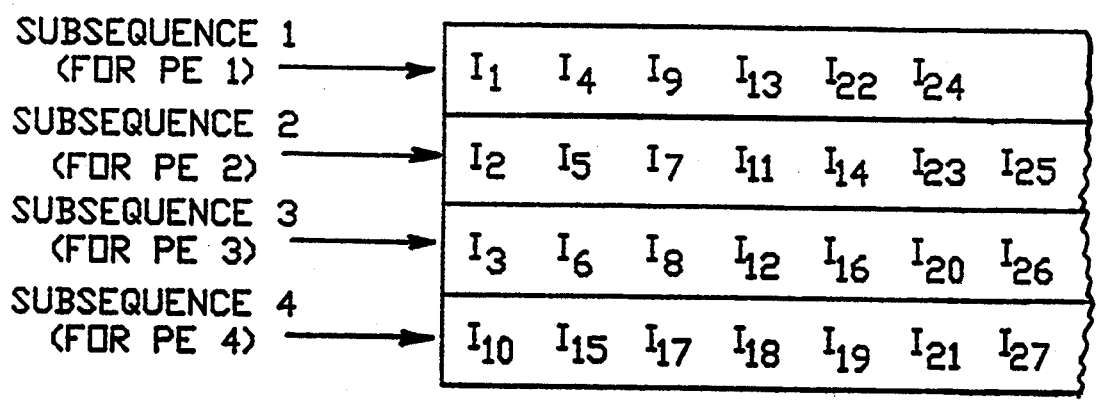
FIG. 1D illustrates the subsequences formed from the Pseudo-Schedule illustrated in FIG. 1C.

FIG. 1D illustrates the subsequences formed as a consequence of the creation of the Pseudo-Schedule illustrated in FIG. 1C. Time Slots and holes are ignored and corresponding subsequences are formed from the Pseudo=Schedule. As will described in more detail in the Sections which follow, MSIS will automatically delay the decoding and execution of instructions until needed inputs are available. It was in anticipation that this will occur that the expected delays were kind of simulated while making the Pseudo-Schedule. The holes in the Pseudo-Schedule correspond to points where it was estimated during the assignment process that corresponding delays will occur in MSIS during execution of the subsequences in the Z-Mode.

SECTION 2 PRIVATE Z-CACHES

Figure 2A:
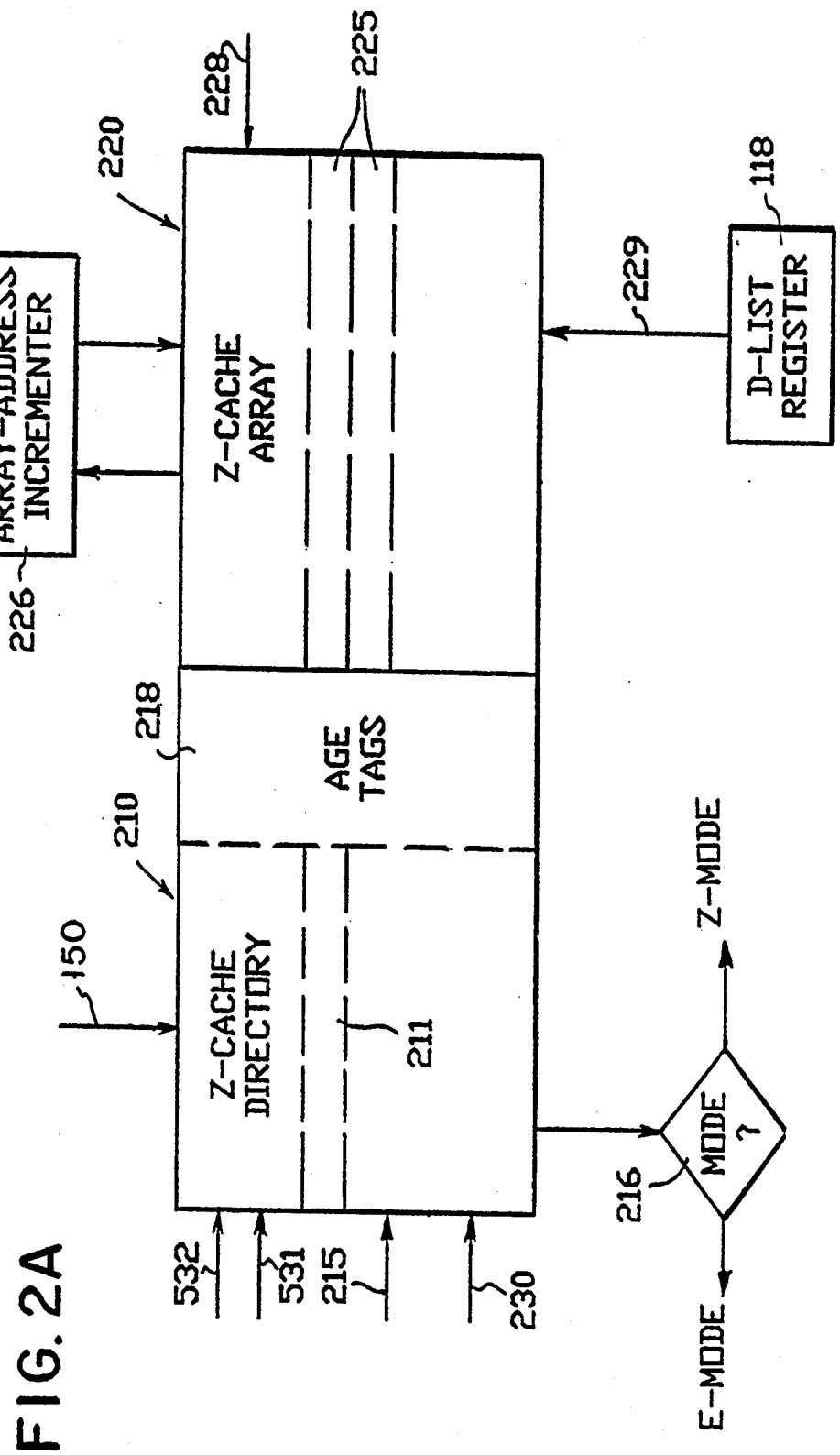
FIG. 2A illustrates the structure of the private Z-Cache used by a single processing element in the preferred embodiment.
Figure 2B:
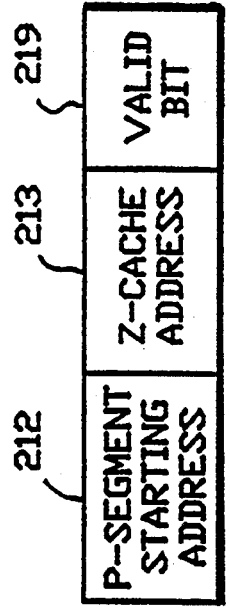
FIG. 2B illustrates the format of an Entry in the Directory of a Z-Cache.
Figure 2C:
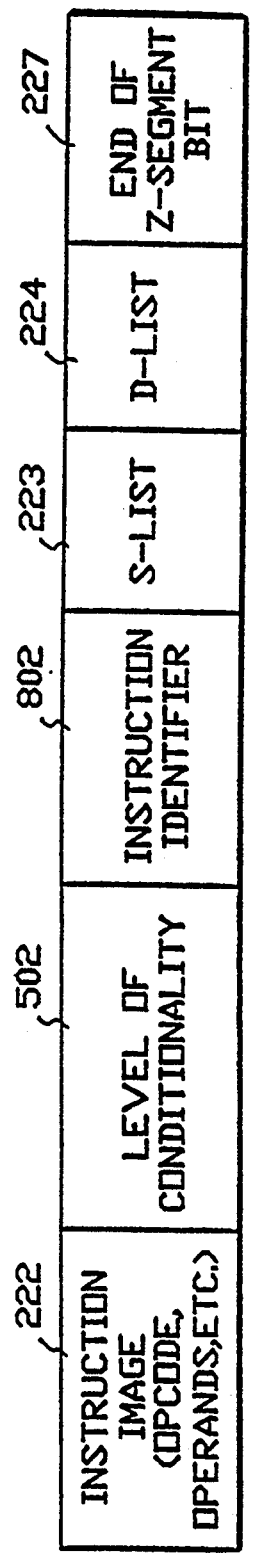
FIG. 2C illustrates the format of a Z-Instruction stored in a Cell of a Z-Cache.
Figure 2D:
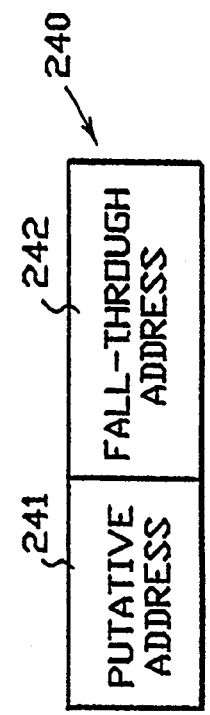
FIG. 2D illustrates an Instruction Format Extension for a Z-Cache Cell.

Instruction fetching during the Z-Mode is done by accessing the Z-Code in a Z-Cache 200 (FIG. 1A) that is associated with each Processing Element. The organization of the Z-Cache is illustrated in FIG. 2A. Z-Cache Directory 210 is used to keep track of the Z-Segments stored in the Z-Cache Array 220. The contents of the Z-Cache 200 represent a prespecified number of Z-Segments, each Z-Segment having a maximum number of Cells 225, each Cell accommodating one Z-Instruction. Each Z-Cache 200 comprises a Directory 210 and an Array 220 of Cells addressed from that Directory. The format of a Z-Cache Directory Entry 211 is shown in FIG. 2B. It contains the Starting Address 212 of the P-Segment from which this Z-Segment was created, the Z Cache Address 213 of the Cell which contains the first Z-Instruction in that Z-Segment for that Processing Element, and a Valid Bit 219.

The Directory invalidation feature using the Valid Bit 219 is used in two situations. Signal Line 531 is used to invalidate all Z-Code in all Processing Elements when a Program Store Compare (PSC) hazard is detected. Signal Line 532 is used to invalidate the current Z-Segment when an Operand Store Compare (OSC) hazard is detected. Both these hazards are described in detail in Section 5.

The Directory 210 can also receive an address from the ZZT-Scanner 660 (FIG. 6) via a Bus 215, which is used as a search argument against the Directory. If a match occurs, the Processing Element will set the mode of the Processing Element to Z-Mode via Decision Element 216.

Instruction fetching (i.e., I-Fetching) during Z-Mode is derived from the Z-Cache. The absence of a match with any Directory Entry Address 212 causes the setting of The Processor Element to the E-Mode via Decision Block 216 and the I-Fetching in E-Mode is derived from the Memory Hierarchy 140 (FIG. 1).

The Z-Cache Array 220 contains the Z-Instructions. Z-Instructions are of fixed size and format, which is illustrated in FIG. 2.2. Each Z-Instruction contains the following information:

Instruction Image 222 (Opcode, Operands, Etc.), which is the usual information necessary to execute the instruction;

Level Of Conditionality 502, which is used by the Operand Store Compare (OSC) controls within the cache to manage the detection of the OSC hazard and determine when Stores may be released to the Memory Hicrachy;

Instruction Identifier 802, which is the sequence number of the instruction within the P-Segment and is used as part of any message sent by the instruction;

S-List 223, which gives the dependency of this instruction on others for input;

D-List 224, which lists the Z-Instructions/Processing Elements that need the results of execution of this Z-Instruction;

End of Z-Segment Bit 227, which is a bit specifying that this is the last instruction for this Processing Element in this Z-Segment.

Successive Z-Instructions for each Processing Element occupy consecutive Cells 225 of the Z-Cache Array 220 associated with that Processing Element and an Array-Address Incrementer 226 is used to access that Cell.

As part of the I-Fetch operation, all the information in the Z-Cache Cell is transferred to the Decoder and other relevant portions of the Processing Element in a manner that will be detailed later.

The creation of Z-Segments in the E-Mode is sensitive to the limitations of the Z-Cache size and structure, which are arbitrary in principle, but are limited in any implementation. Z-Segments exceeding the capacity of the Z-Cache cannot be created as the E-Mode is terminated and trimmed to the last full Level of Conditionality.

There being no relationship between Memory Hicrarchy addresses of instructions and their position in the Z-Cache, some of the Z-Instructions must also have an Instruction Format Extension 240 (FIG. 2D) associated with them, which contains Memory Hierarchy addresses when this information will be required. In the case of branch instructions this extension is required. Each conditional branch instruction has the address of the Putative Address 241 that was used to generate the Z-Code, and a Fall-Through Address 242 which is the value of the Program Counter (PC) and points to the next-sequential instruction that follows the branch.

If the branch target is:
the same as the Putative Address 241, no action need be taken,
is not the Putative Address 241 because the branch is not taken, then a Branch Wrong Guess (BWG) action is taken with respect to the Fall-Through Address 242,
if the branch is taken to a target other than the Putative Address 241, that address is generated by the Processing Element at the point of address generation of the branch instruction and the BWG action can be taken with respect to that target.

For unconditional branches, only the Putative Address 241 is used and the value of the Program Counter (PC) can occupy the Fall-Through Address 242. The value of the PC can be used to set the value of registers, when PC-dependent values are needed for such instructions as BAL(R) (Branch and Link (Register)).

The contents of all Z-Cache Directories are the same although the contents of the Z-Instruction Cells in the Z-Cache Array is different in different Processing Elements. The maintenance of multiple identical Z-Cache Directories represents a trade-off between creating greater autonomy within the Processing Elements and sending messages to the Processing Elements when a new Z-Segment is to be initiated.

At the start of the E-Mode, a common Directory Entry is made in all Z-Caches using information supplied by the Processing Element via a write Bus 230. If all Entries in the Directory 210 are valid, then a Least Recently Referenced (LRU) algorithm is used to select the Z-Segment to be replaced (e.g., employing the standard age-tag dating of directory entries using Age Tags 218).

The Cells 225 for the Z-Segment in each Processing Element are updated using the Bus 228. This Bus works in conjunction with the Array-Address Incrementer 226, so that instructions assigned to a Processing Element are stored as Z-Instructions in consecutive Cells, although they may not be consecutive in the original instruction stream.

During the E-Mode, the information for the Z-Instruction format is available at the decode time of the instruction with the exception of the D-List. The Cells are updated with D-List information via Bus 229, as a broadside load of the Cells, using a parallel write operation from a D-List Register 118 maintained by the Processing Element. A partial broad-side write is performed into the D-List 224 field within each Cell occupied for that Z-Segment. This operation is done at the end of Z-Code generation.

SECTION 3 SEPARATE REGISTER FILES

Figure 3:
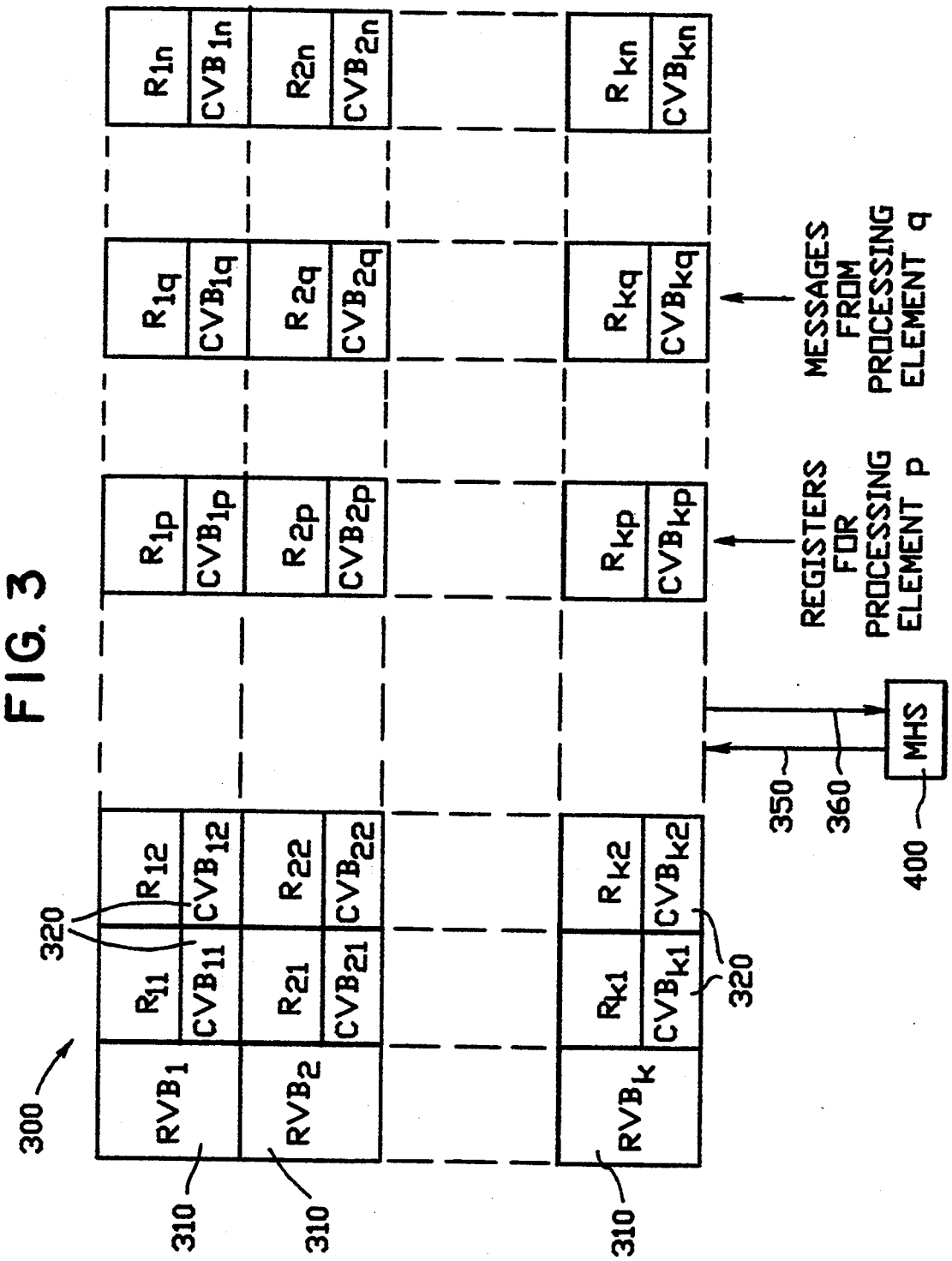
FIG. 3 illustrates a Register File for one of the processing elements in the preferred embodiment.

The Register File structure of MSIS is shown in FIG. 3. Each Processing Element (PE) has its own dedicated Register File 300. For a system of n Processing Elements and with k conventional registers, Register File 300 is an n X k matrix. Each PE has its private copy of R. For Processing Element p, the usage of Register File 300 is as follows:

The element R [r,p] is just like its conventional register r. That is, for PE p, the cell called R [r,p] acts as the source for all instructions executed by PE p which need register r, and acts as the sink for all instructions on PE p that modify register r.

The element R [r,q] (where q is not equal to p) holds a message (if any) from processor q about what q stored into register r.

Each row R [r,*] is associated with a Valid Bit 310 which indicates whether the register contents of r are to be found in that row or whether they must be initialized from another source.

Each element R [r,j] when itself valid, contains the register contents and the ID of the instruction that stored those contents.

There are two notions of valid within the Register File 300 and they are associated with bits maintained in different places. If the PE is initialized following a transition and it is necessary for the initial value to be derived from the ZZT RFILE 650 (FIG. 6), then the Valid Bit 310 is used which indicates that all items on the row R [r,*] are invalid. Another valid status is associated with each R [r,j] and is part of the contents of the cell R [r,j]. This is called the Cell Valid Bit 320 and refers to the validity of the contents of the cell R [r,j].

The purpose of reserving for each register a position in the Register File 300 for each other Processing Element is not only to simplify the deadlock avoidance mechanism but such a structure is the minimum size structure that allows the PE to manage register contents during the E-Mode in a completely general and totally asynchronous fashion. If register lists were used instead, deadlock might occur in an asynchronous system when a Processing Element fills up the register list for a given register by sending messages that will be required in the distant future and preventing urgently needed messages from being posted on the list.

The formats of the contents of the Register File 300 and the operations of the PEs with respect to Register File 300 are described in more detail in Section 8. The basic operations that the PE performs with Register File 300 are: VALIDATE, RECORD, SEND, and RECEIVE, which are fully detailed in Section 8.

The Message Handling System (MHS) 400 receives a message and enters it in the list for the cell within the Register File 300 that is designated by the message. Within the MHS, these messages are stored in the list position that is associated with the sending PE. Within the receiving PE, there is never any more than one outstanding future pending register value in the Register File from any other PE. The method of inserting the message into the proper cell of the Register File is by use of a write Bus 350 from MHS 400. The operations specified as VALIDATE, RECORD, SEND, and RECEIVE, that are detailed in Section 8, derive the appropriate value of register r from the row R [r,*] and for PE p will move this value into the cell R [r,p], when this is indicated by the S-List of the Z-Instruction.

For PE p, the use of R [r,q] where q≠p causes an echo message to be sent to the MHS via a Bus 360. The action of the MHS upon receipt of the echo message will be described in Section 4. In summary however, this echo message allows the MHS to send the oldest pending message that it has for the just released cell within the Register File. As all Processing Elements execute instructions in conceptual sequence with respect to the instructions that have been assigned to them, that is, the sequence of instructions assigned to a given Processing Element is a subsequence of the original single instruction stream, the oldest pending message for the cell that was just freed up is the next message, associated with that cell that the receiving Processing Element will require. During the interval between echo and receipt of the new message, the cell will be marked invalid via the Cell Valid Bit 320.

Another feature of the messages stored in the Register File, from other Processing Elements, is that they will all be used unless a Branch Wrong Guess occurs. The message handling primitives (i.e., VALIDATE, RECORD, SEND, and RECEIVE) guarantee that no unnecessary messages are sent and thus the deadlock-free operation of MSIS is guaranteed.

SECTION 4 MESSAGE PASSING BETWEEN PROCESSING ELEMENTS

Figure 4A:
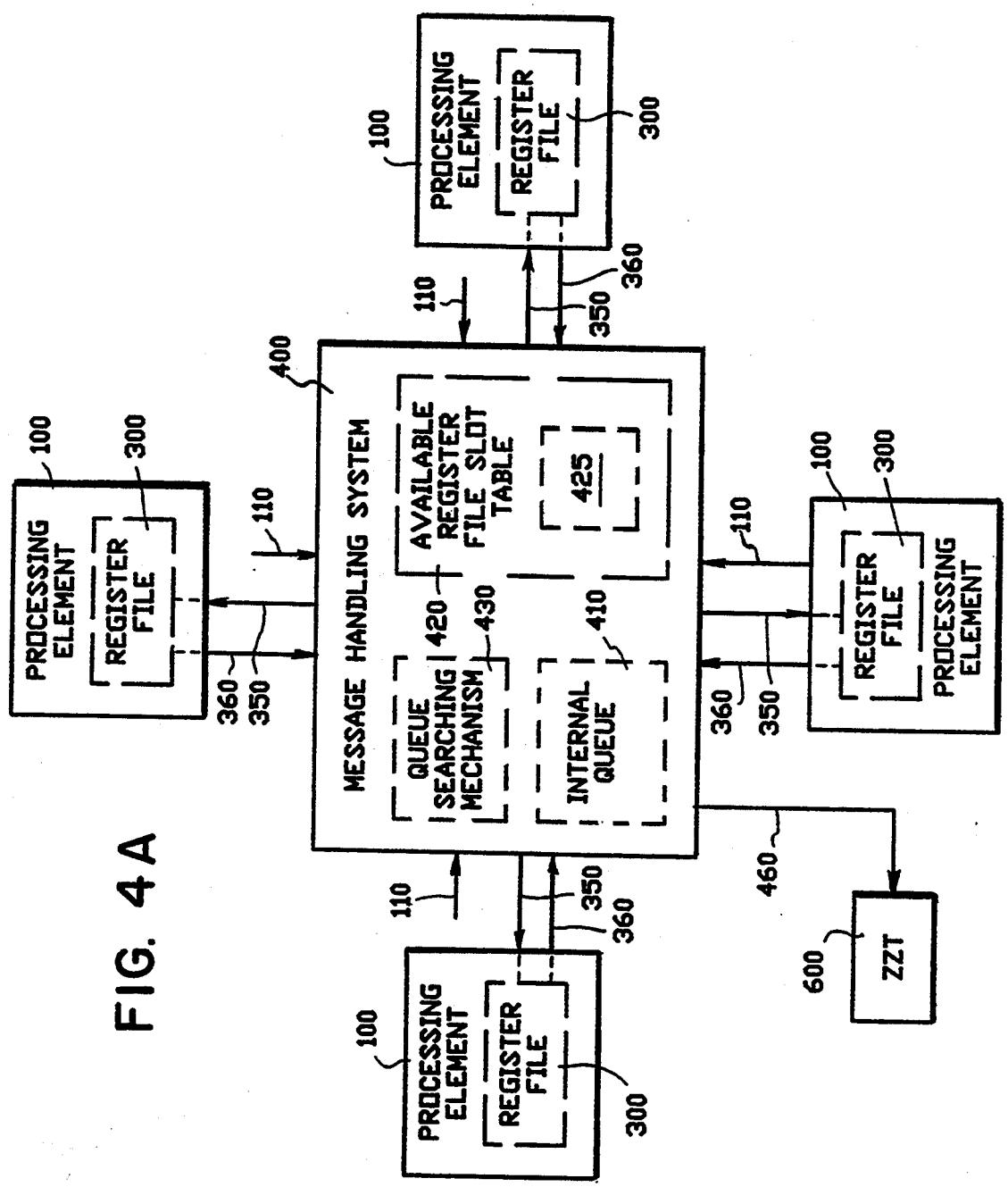
FIG. 4A is a block diagram of the Message Handling System which communicates register values to processing elements in the preferred embodiment.

The structural elements of the Message Handling System (MHS) 400 are illustrated in FIG. 4. The bus operations of the MHS have been designated as:

Bus 110, which is used to send messages from each Processing Element to the MHS (FIG. 1);

Bus 350, which is used to send messages from the MHS to the Register File of the receiving Processing Element (FIG. 3);

Bus 360 which is used to send an echo of the message back to the MHS to allow a pending message for that freed up RLE to be forwarded to the receiver.

The formats of the messages will be discussed in Section 8 along with the register handling primitives: VALIDATE, RECORD, SEND, and RECEIVE.

The MHS must have an Internal Queue 410 to allow it to pend messages that can not be immediately sent to the receiver. The Queue size is related to the Z-Segment size so that the Queue size is larger than the total number of messages sent within the Z-Mode. The E-Mode monitors the total number of messages which must be sent and will terminate a Z-Segment when the message total might exceed the Queue size.

Figure 4B:
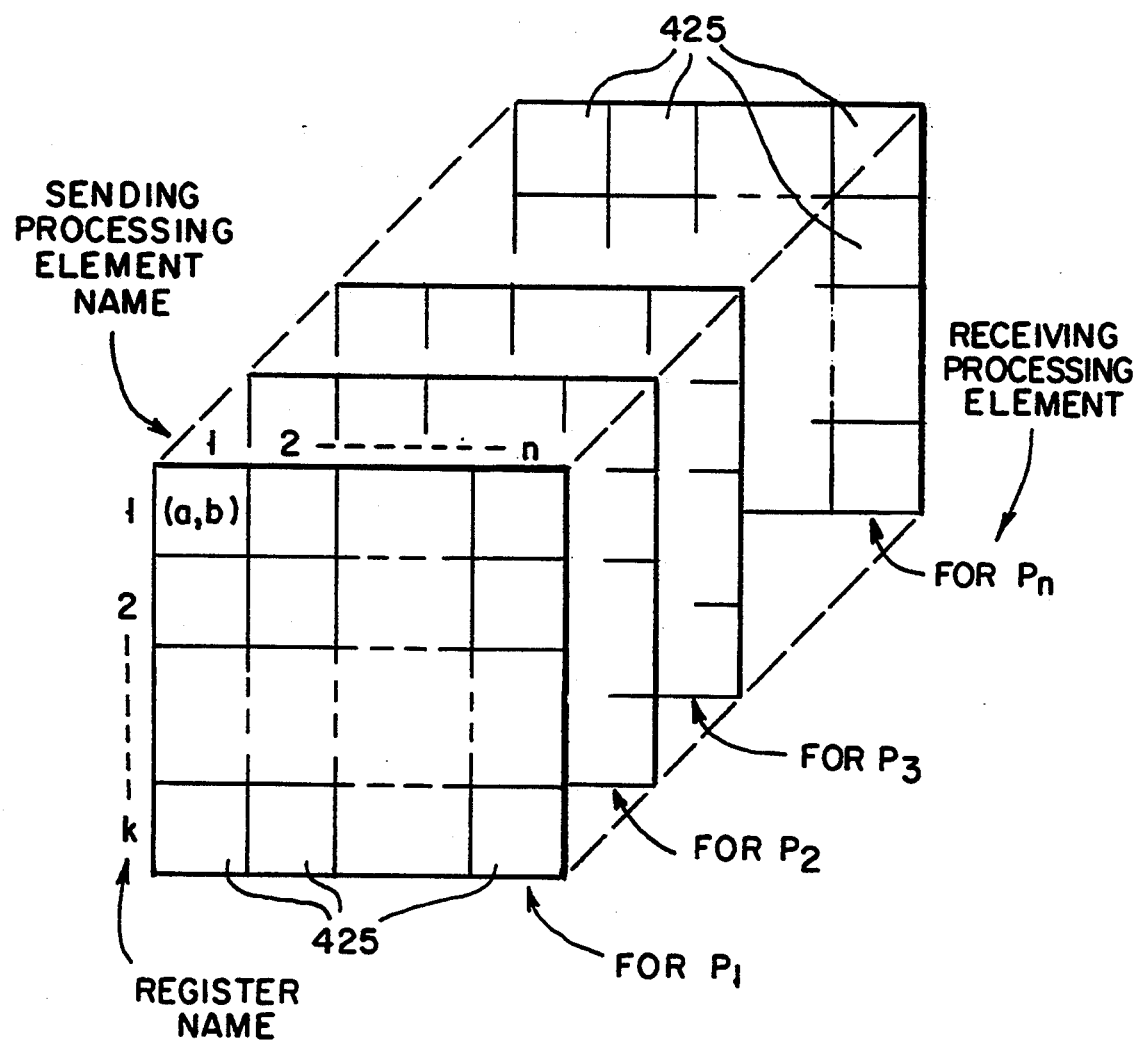
FIG. 4B illustrates the Internal Queue of the Message Handling System.

The MHS also has an Available Register File Slot Table (ARFST) 420, illustrated in detail in FIG. 4B, which records an array of Two Bit Entries 425 designated (a,b) for each receiving Processing Element. The elements of the ARFST for a given receiving Processor Element correspond to a matrix with rows designating Register File names and columns identifying the sending Processing Element name. The values possible for (a,b) are:

- (0,0)—indicating that a slot is available and no message is pending for that slot;
- (1,0)—indicating that the slot is occupied and no message is pending for that slot;
- (1,1)—indicating that the slot is occupied and at least one message is pending for that slot.

At the outset, following the completion of a Z-Segment, or a Branch Wrong Guess, the Internal Queue 410 is cleared and the ARFST 420 is reset so all entries are (0,0) for all receiving Processing Elements. As each message is processed, the entries are modified. On the receipt of the echo message the entries are modified. If a message is queued, because a equals 1, the entry is modified as appropriate. The purpose of the queuing bit b is to avoid unnecessary queue searches by Queue Searching Mechanism (QSM) 430 if no message is queued for a just released slot. The QSM 430 must continue the search to determine if more than one message is pended for the slot. If there is only one message the b must be set to zero, otherwise it remains one. The sending of a queued message following an echo always sets a to 1.

Messages are also sent from the Processing Elements to the ZZT 600, a Branch Wrong Guess recovery unit. Such messages use the Bus 110 to get to the MHS and Bus 460 to get to the ZZT. The message contains the Level of Conditionality (LC) 502 (FIG. 2) of the sending instruction and the Register name, which allows the value of the Register to be stored in the ZZT in the proper location. This accommodates maintenance within the ZZT of the last change to a Register value at each LC since the D-List of the instruction which last changes the value of a Register at each LC includes the ZZT. In the Z-Mode when the D-Lists are already available, the sending of the Register value to the ZZT Frame 640 (FIG. 6) is performed as described (i.e. via Bus 110) from the PE to the MHS and via Bus 460 from the MHS to the ZZT Frame.

In the E-Mode, where the D-List is formed based on the determination that a future instruction will require the result of another PE execution and where the input to the ZZT Frame are determined when each PE decodes a branch and determines that it was the last PE which modified the Register in conceptual sequence, the sending of the message is via Bus 135 to the Memory Hierarchy with those bits which distinguish the message as a STORE to the ZZT Frame.

Figure 6A:
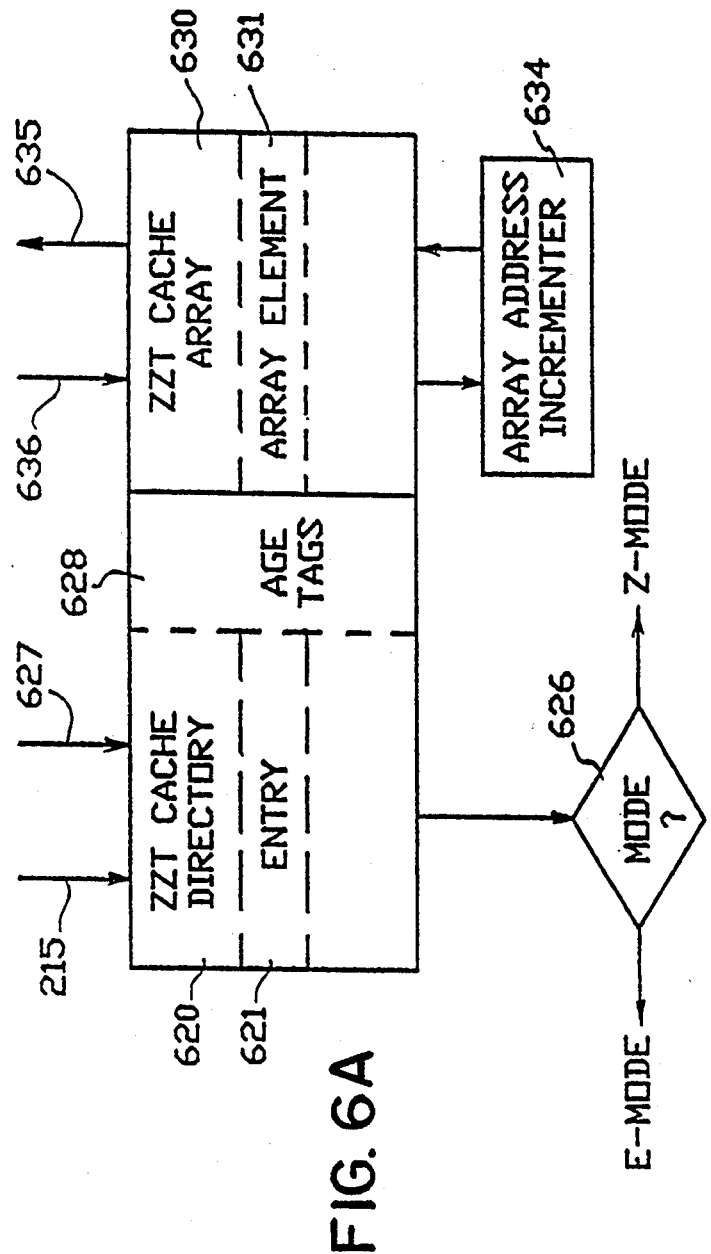
FIG. 6A is a block diagram of the ZZT Cache used to control and use the ZZT Frame and ZZT RFILE, which are all used to set register values upon a branch wrong guess or Segment transition.
Figures 6B, 6C:
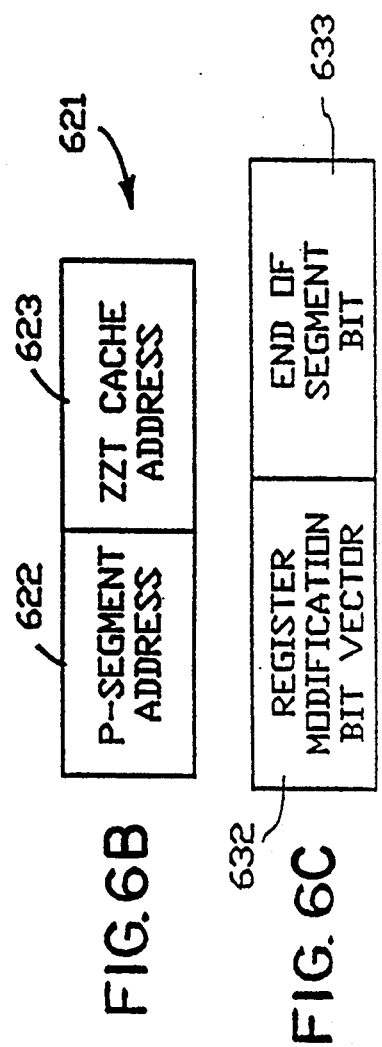
FIG. 6B illustrates the format of an Entry in the ZZT Cache Directory.
FIG. 6C illustrates the format of an Element in the ZZT Cache Array.
Figure 6D:
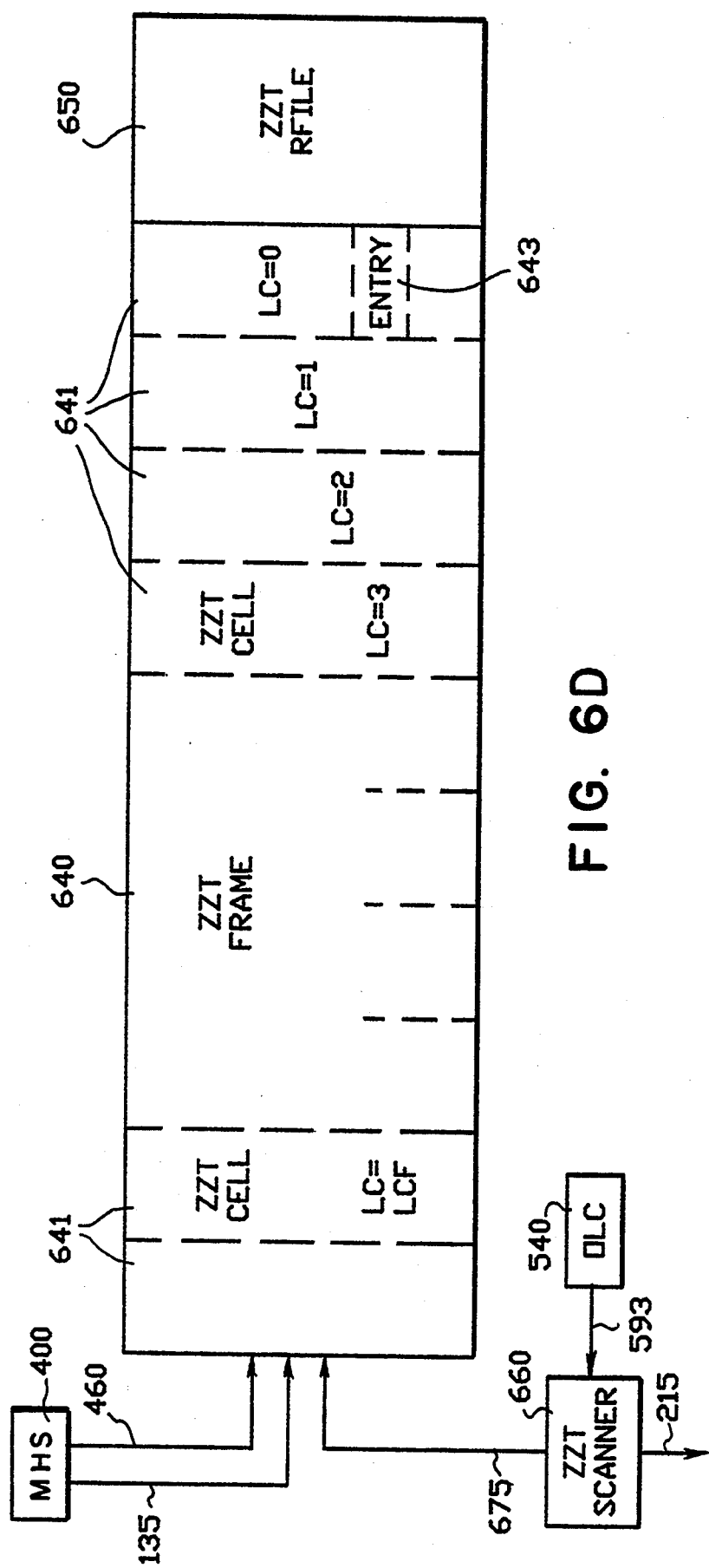
FIG. 6D is a block diagram of the ZZT Frame.
Figure 6E:
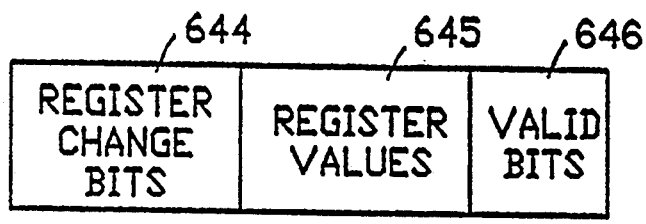
FIG. 6E illustrates the format of a ZZT Cell in the ZZT Frame.
Figure 6F:
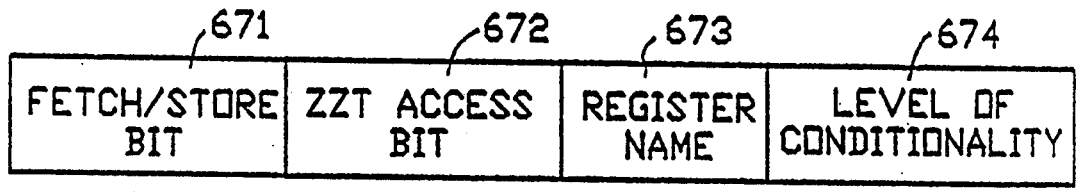
FIG. 6F illustrates the format of a message sent to a ZZT Cell.

In the E-Mode, if an instruction is the conceptually last instruction to modify a Register at a given LC, a message is sent via Bus 135 to the cell in the ZZT Frame for the current LC. Such a message carries the following information:

- A Fetch/Store Bit 671 (FIG. 6F) indicating FETCH or STORE, and a ZZT Access Bit 672 (FIG. 6F). These two bits in combination allow the Memory Hierarchy 140 interface to distinguish FETCH from the ZZT RFILE from a STORE in the ZZT Frame or from other FETCHES and STORES to the Memory Hierarchy 140 interface;
- Register Name 673 (FIG. 6F); and
- Level of Conditionality (LC) 674 (FIG. 6F).

As a result, for a STORE ZZT Access, the ZZT Frame Entry is modified as follows: For the modified Register, the Register Change Bits 644 (FIG. 6E) in the ZZT Cell 641 for the LC 674 and the Register Name 673 is turned on and the new Register contents are written into the corresponding Register Values field 645 (FIG. 6E).

This entire arrangement within the MHS is to always allow a Processing Element to receive a pending message, to operate asynchronously with respect to the sender and the receiver, and to avoid deadlock. As each Processing Element awaits the required messages before it processes the instruction assigned to it or any conceptually later instructions, deadlock ensues if the message that is awaited cannot be sent. The disclosed design prevents a deadlock condition from occurring since the needed message can never be blocked.

SECTION 5 MONITORING FOR OSC AND PSC

The structural elements of the Operand Store Compare (OSC) Controls and the Program Store Compare (PSC) Controls 500 are illustrated in FIG. 5. As each FETCH and STORE is presented to the Memory Hierarchy Interface 145, Controls 500 monitor OSC and PSC and interact with the access. Thus, the placement of Controls 500 can be part of the Memory Hierarchy Interface 145 and can be considered as an adjunct to it. each of these Controls 500 is now described separately.

Operand Store Compare (OSC)

The architecture of a processor usually requires that a FETCH from a memory location must see the value stored in that location by the latest STORE preceding that FETCH in the conceptual sequence. This is called OSC and a violation of this is known as an OSC hazard. In MSIS, since the FETCH and the STORE may be performed asynchronously on different Processing Elements, they need to be monitored to determine whether or not a possible OSC hazard has occurred.

For the remainder of this Section 5, the term FETCH will denote an operand fetch and instruction fetching will be specifically indicated as such whenever the intent is to consider it.

An OSC hazard is said to be intra-Processing Element, if the corresponding FETCH and STORE operations are executed on the same Processing Element. As instructions are maintained in conceptual sequence within a Processing Element, the monitoring of the intra-Processing Element OSC is standard. Hence, we will not discuss this further and concentrate on inter-Processing-Element hazards.

An OSC hazard is said to be inter-Processing-Element, if the corresponding FETCH and STORE operations are executed on different Processing Elements. The monitoring of such a hazard is done using the following two attributes of an instruction:

1. Level of Conditionality (LC) 502 (FIG. 5C), which is the number of branch instructions that executed prior to the execution of this instruction in the P-Segment. The LC of the first instruction in a P-Segment is zero. The LC of an instruction that is not preceded by a branch in the P-Segment is the same as that of its predecessor. The LC of an instruction that is preceded by a branch in the P-Segment is one more than that of its predecessor. Thus, all instructions within a branch group, including the branch which terminates the branch group, have the same LC; and
2. Instruction Identifier (ID) 802 (FIG. 5C), which is the sequence number of the instruction in the P-Segment.

In E-Mode, all Processing Elements see all instructions in sequence, so both LC and ID are known in a natural way. As Z-Code is generated, LC and ID are associated with each Z-Instruction and hence this information is available in Z-Mode as well.

The OSC Controls maintain two tables: a Fetch Table 510 (FIG. 5A) with a Comparator 514 and a Store Table 520 with a Comparator 526.

Figure 5A:
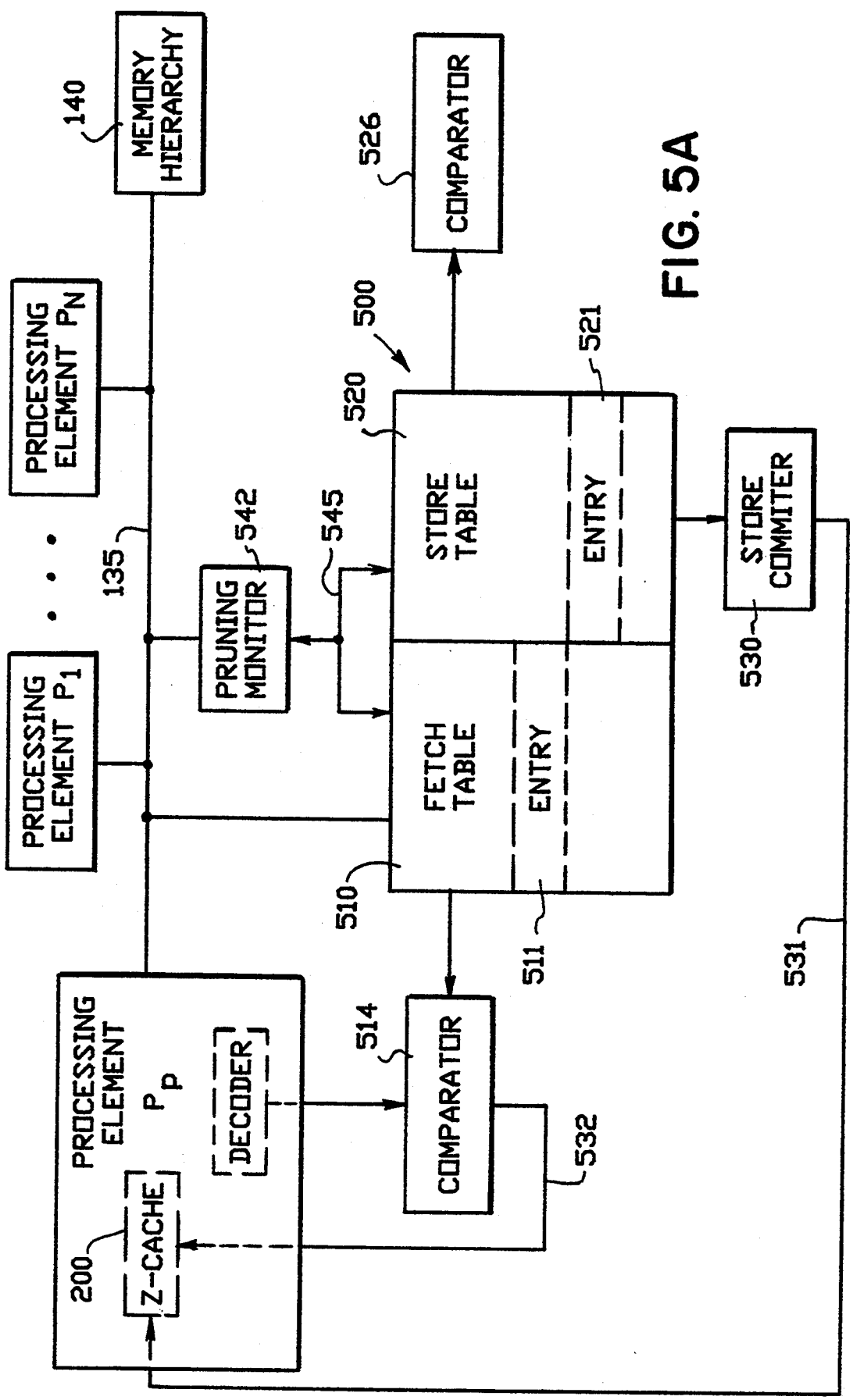
FIG. 5A is a block diagram of the OSC/PSC Controls which monitor out-of-sequence hazards in the preferred embodiment.
Figure 5B:
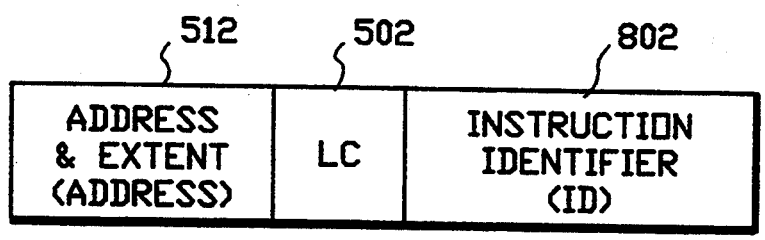
FIG. 5B illustrates the format of a Fetch Table Entry in the OSC/PSC Controls.

A Fetch Table Entry 511 is illustrated in FIG. 5B and has the form (Address, LC, ID). Address 512 is the full address of the FETCH and its extent in bytes. The LC 502 and the ID 802 of the FETCH instruction that generated the FETCH are also included in the Fetch Table Entry 511. FETCHES that span multiple Double Words (DW) create multiple entries in the Fetch Table.

Figure 5C:
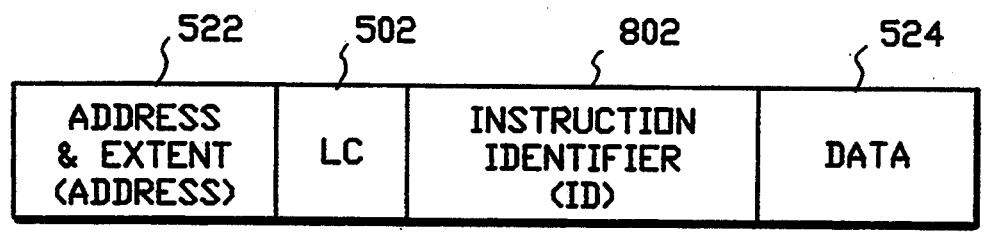
FIG. 5C illustrates the format of a Store Table Entry in the OSC/PSC Controls.

A Store Table Entry 521 is illustrated in FIG. 5C and has the form (Address, LC, ID, Data). Address 522 is the full address of the STORE and its extent in bytes. The LC 502 and the ID 802 are derived from the STORE instruction. Data 524 is the full DW to be stored into the Memory Hierarchy, as part of the STORE instruction. The Data 524 is derived by merging the result of the STORE with the other bytes within the DW as taken from the Memory Hierarchy. Should a STORE cross a DW boundary, two entries in the Store Table are made, one for each DW affected. Store instructions which generate multiple DWs will be treated similarly.

A FETCH is executed as follows:
1. By matching on the Address field, Entries are selected from the Store Table that have the same Address as the FETCH instruction and have a smaller ID than that of the FETCH instruction.
2. If a match occurs, the FETCH returns the Data 524, to the requesting Processing Element, from the matched Store Table Entry having the largest ID that is less than the ID of the FETCH.
3. If there is no match on any STORE entry with a lower ID, then the value for the FETCH is obtained from the Memory Hierarchy 140.
4. An Entry is made into the Fetch Table for this FETCH instruction. The Processing Element FETCH/STORE LC Table 544 is updated, if it changes.

A STORE is executed as follows:
1. By matching on the Address field, Entries are selected from the Fetch Table that have the same Address as the STORE instruction and have a larger ID than that of the STORE instruction.
2. If any such entry exists, an OSC hazard is raised.
3. An entry is made into the Store Table for this STORE instruction. The Processing Element FETCH/STORE LC Table 544 is updated, if it changes.

Figure 5D:
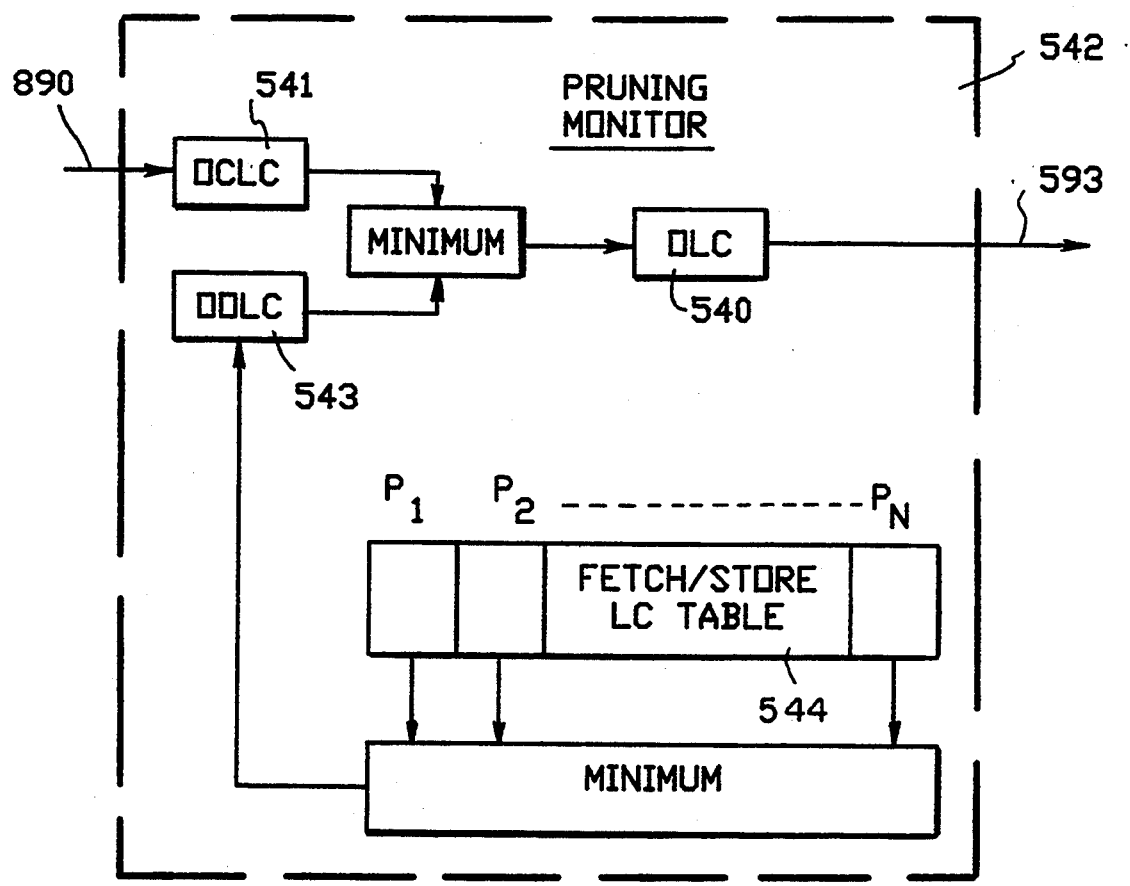
FIG. 5D illustrates the Pruning Monitor in the OSC/PSC Controls.

The entries in the above two tables are pruned using a Pruning Monitor 542, illustrated in detail in FIG. 5D, which maintains 3 quantities:
1. Overall Certified Level of Conditionality (OCLC) 541: The branch resolution mechanism communicates to the Pruning Monitor via Bus 890 the resolution of each branch instruction in the Z-Code. At any given time, the OCLC is the largest LC, such that all branches at lower levels have been resolved correctly. When a branch at the LC which is one more than the OCLC is resolved as a BWG, the stores at the LC of the branch are pruned and the OSC controls are cleared.
2. Overall Operand Level of Conditionality (OOLC) 543: Whenever a memory FETCH or STORE instruction is executed, its LC is used to update the FETCH/STORE LC Table 544 entry for that Processor Element and a value that is one less than the minimum of these entries across all Processing Elements is the OOLC 542. Whenever a Processor Element executes the final instruction of its Z-Code as indicated by the End of Z-Segment Bit 227 (FIG. 2C), the Processing Element will send an End of Z-Code signal as a pseudo-FETCH. The sole purpose of this signal is to set the value of the entry in the FETCH/STORE LC Table for this Processing Element to a value that is sufficiently high so that it does not figure in the minimization.
3. Overall Level of Conditionality (OLC) 540: OLC is the minimum of OOLC and OCLC.

The implication is that each Processing Element has executed all instructions at levels lower than OLC, as instructions within a processor are always in conceptual order. Furthermore, all branches at levels lower than OLC have also been resolved. Hence, any FETCH/STORE entries at levels lower than OLC can be pruned. Whenever OLC changes, the Pruning Monitor takes the following actions via Bus 545:
1. Remove all Entries from the Fetch Table with LC lower than OLC.
2. Select all Entries from the Store Table with LC lower than OLC.
3. If none of the selected Entries raises a PSC (as described later), then scan the above selected Entries in increasing order of their ID and as each Entry is scanned, commit the STORE and delete the Entry from the Store Table.

The OLC 540 (FIG. 5D), using Bus 593, has the task of informing the ZZT Scanner 660 (FIG. 6D) and the OSC/PSC Controls as to the final LC of the Z-Segment, LCF, and the new Segment starting address of the next Segment following a BWG.

Figure 7A:
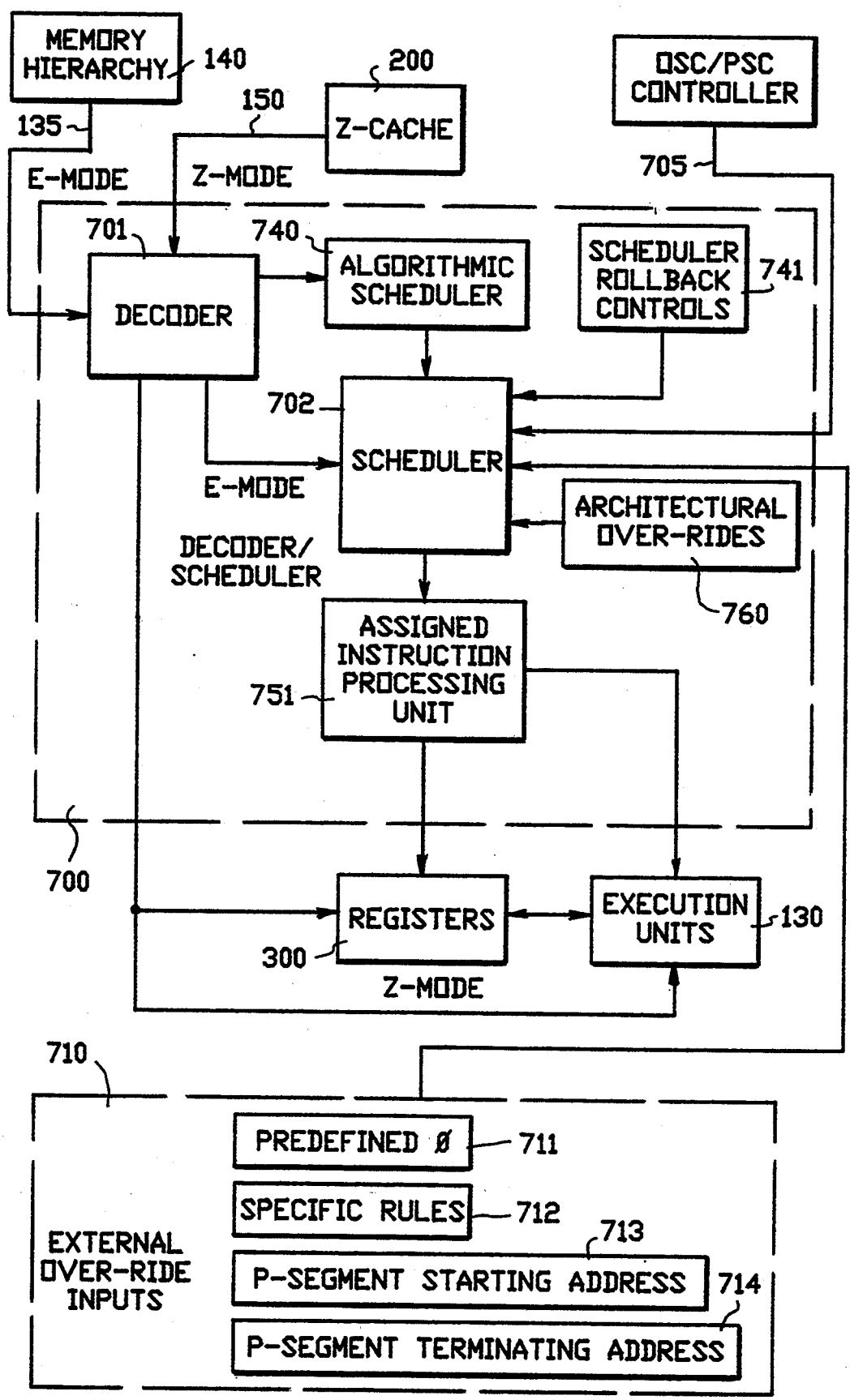
FIG. 7A is a block diagram of a Decoder/Scheduler in a processing element in the preferred embodiment.

When an OSC hazard is raised, the Decoder 700 is presented with the Instruction Identifiers of the instructions which created the hazard via a Bus 705 (FIG. 7). The hazard is cleared by simulating a Branch Wrong Guess at the preceding LC. A hazard raised at conditionality level zero restores the machine state that corresponds to the start of the Program Segment (P-Segment). A hazard raised at some non-zero LC, restores the machine state that corresponds to the branch instruction at the preceding LC. In either case, the current Z-Code is invalidated in all Z-Caches using Bus 532 and E-Mode is entered.

To avoid the hazard within a Level of Conditionality, a FETCH and a STORE whose instruction formats suggest that they will access the same memory location (for example if their operands use the same base and index registers and have the same displacements), should be scheduled on the same Processing Element.

Program Store Compare (PSC)

Certain architectures support self-modifying programs by allowing "stores into the instruction stream." For such architectures MSIS is required to determine if the Z-Code generated is valid for subsequent re-execution by monitoring for the possibility that storing may have occurred into the I-Stream for the code used to generate this Z-Segment or an active Z-Segment may itself STORE into its own I-Stream. The name given this hazard is PSC.

The Memory Hierarchy has a Cache and an associated Directory that contains an Instruction Reference Bit that specifies that the line was used as a source of instruction fetching in the E-Mode. If such a line leaves the cache then PSC is raised and all Z-Code is invalidated using Bus 531 (illustrated also in FIG. 2A).

If the Store Commiter 530 which commits STORES to the Memory Hierarchy based on the pruning of the Store Table 520 determines that a STORE will be made into a line with the Instruction Reference Bit set on, it raises the PSC hazard and cancels the commitment of all Stores at the LC where the PSC hazard was raised. The machine state at the prior LC is restored and the PSC hazard is cleared in the same manner as an OSC hazard.

SECTION 6 HANDLING BRANCHES

In pipelined architectures, several instructions could be partially executed before a branch decision is determined. Often this is done by guessing the branch decision using some criteria. When a branch is guessed wrong, the corrupted state of the processor must be restored to the state the machine was in right after the branch. Processor architectures differ in what constitutes their machine state. Generally the state comprises the contents of addressable registers.

MSIS complicates the state restoration process in two ways. First, a BWG in E-Mode results in discarding the Z-Code built since the wrongly guessed branch instruction and re-adjustment of instruction IDs for the correct sequence of instructions following the branch. Second, the register state in Z-Mode is distributed in both space and time. As a result, state restoration is more complex, requiring some broadcast of information to all Processing Elements and resynchronization of their activities.

Furthermore, MSIS involves transitions between E-Mode and Z-Mode even without BWG. The actions taken during such transitions are identical to those during a BWG. We employ a common mechanism, known as ZZT, to deal with all branching and transition aspects uniformly. This is the subject matter of this Section and is illustrated in FIG. 6.

There are four basic data structures that are involved in the implementation of ZZT, namely a ZZT Cache Directory 620, a ZZT Cache Array 630, A ZZT Frame 640 and a ZZT RFILE 650.

ZZT Cache Directory

The ZZT Cache Directory 620 is used to remember the P-Segments for which Z-Code is available. Each ZZT Cache Directory Entry 621 is of the form (P-Segment Address 622, ZZT Cache Address 623) as illustrated in FIG. 6B. The P-Segment Address 622 is the address of the first instruction in the P-Segment and the ZZT Cache Address 623 is a pointer into the ZZT Cache Array 630.

The ZZT Cache Directory 620 is searched associatively to match a given address supplied by the Bus 215 with the Z-Entry Address 622 of an Entry 621. When a match occurs, it gives out the corresponding ZZT Cache Address 623. A match causes the mode to be set to Z-Mode at Decision Element 626. In E-Mode, a match causes a transition from E-Mode to Z-Mode. In Z-Mode, a match causes a transition from one Z-Segment into another Z-Segment. A non-match implies that no Z-Code is available for the search argument. In E-Mode, a non-match results in continued E-Mode execution. In Z-Mode, a cache-miss causes a transition from Z-Mode into E-Mode.

New entries are made into the ZZT Cache when an E-Mode execution completes the assembly of a new Z-Segment. Entries in the ZZT Cache are managed in the usual manner with an LRU replacement strategy using Age Tags 628.

ZZT Cache Array

The ZZT Cache Array 630 contains the repository of information for Z-Segments that have been composed. Each Z-Segment occupies a portion of the ZZT Cache Array and uses one Array Element 631 for each Level of Conditionality. Thus, a Z-Segment having K Levels of Conditionality in it, will occupy K consecutive elements in the ZZT Cache Array. The pointer to the first Array Element of a Z-Segment is the ZZT Cache Address 623. Each ZZT Array Element 631 has the form (Register Modification Bit Vector 632, End of Segment Bit 633) as illustrated in FIG. 6C. The End of Segment Bit 633 is 1 for the last Array Element of the Z-Segment and is 0 for the rest. The Register Modification Bit Vector 632 contains one bit for each addressable register. Bits within the Bit Vector 632 indicate whether Z-Instructions from this Z-segment and for this Level of Conditionality LC modify each register or not.

When a new Z-Cache Directory Entry 211 is made in the Z-Cache 200 (FIG. 2), a corresponding set of Entries are made in the ZZT Cache 600. A ZZT Cache Directory Entry 621 is made in the ZZT Cache Directory 620 and several ZZT Array Elements 631 are made in the ZZT Array 630. At a transition to Z-Mode, the information in the associated ZZT Array Elements 631 is copied from the ZZT Cache Array 630 into the ZZT Frame 640.

The ZZT Cache Array is equipped with a read Bus 635 and a write Bus 636 and an Address Incrementor 634 for accessing the elements corresponding to the called Z-Segment until the End of Segment Bit 633 is encountered.

ZZT Frame

The ZZT Frame 640 is used to dynamically monitor the modifications made to registers between branches, i.e. at each LC. It acts as a central repository for the distributed state of registers in the machine should that information be needed to recover the machine state. For each LC, it asynchronously receives from the appropriate PEs and stores the most recent value for each register. This information comes from the MHS via Bus 460 since each Z-Instruction which is the conceptually latest instruction within an LC that modifies any register will include the ZZT Frame 640 in its D-List. In the event of a BWG or a mode transition, the ZZT Frame 640 in conjunction with the ZZT RFILE 650 supplies the correct initial state of registers for the next Segment.

A single ZZT Frame causes a synchronous transition so that all PEs have finished all Z-Instructions that have an LC less than or equal to the LC that terminates the prior Segment (herein named the Caller Segment) before any PE starts the first instruction of the next Segment (herein named the Called Segment). For asynchronism between PE operations in regard to Caller Segments and Called Segments, a second ZZT Frame can be provided so that operations performed by PEs that relate to initialization, Caller Segment instructions and Called Segment instructions can be done correctly. The limitation associated with two ZZT Frames is that asynchronism is achievable across a maximum of one transition.

The ZZT Frame 640 is organized as an array, having one ZZT Cell 641 for each LC. The ZZT Cell is accessed by specifying the LC and a register name. The ZZT Cell associated with a LC has the form: (Register Change Bits 644, Valid Bits 646, Register Values 645). The Register Change Bits 644 field holds the Bit Vector 632 and is derived from the ZZT Cache Array Element 631. It indicates which registers will be modified at this LC. The Valid Bits 646 field is a bit vector indicating which registers have been modified already within the current execution of the Z-Segment and have placed their values in the Register Values 645 field. A cell is initialized by copying the Bit Vector 632 from the ZZT Cache Array Element into the Register Change Bits field and resetting the Valid Bits field and Register Values field to all zeroes. When the appropriate PE sends an update for a register at the LC of the Cell, the value is written into the Register Values field for this LC at this register position and the appropriate bit in the Valid Bits field is turned on.

ZZT RFILE

The ZZT RFILE 650 holds the contents of all registers at the beginning of the Called Segment, which is also the end of the Caller Segment.

Usage of ZZT Structures in E-Mode

During E-Mode execution, the above data structures are used as follows:

1. When we enter into E-Mode execution, the ZZT RFILE contains the valid contents of all registers at the entry point. Initially this is true, as we assume that the ZZT RFILE will be so initialized. Each time we re-enter E-Mode, we will ensure proper setting of the ZZT RFILE by performing the following operation. Using the final LC of the Caller Segment, LCF, and for each register r, a backwards scan from the LCF through the Cells of the ZZT Frame (involving if necessary the ZZT RFILE contents) determines the latest value of each register, which becomes the new value for that register in the ZZT RFILE. This set of values also becomes the initial register values for the Called Segment. The ZZT Scanner 660 performs this scan operation and will wait until the register value required to replace the value in the ZZT RFILE is valid by examining the ZZT Frame Valid Bits 646 for the register r in the Cell with the highest LC that is less than or equal to LCF. The default will be to use the value in the register r that is initially in the ZZT RFILE prior to the scan. This occurs only if there is no change to the register during the entire Caller Segment. The fact that the ZZT Scanner does this operation before issuing the Starting Address of the Called Segment to all PEs is what causes all PEs to synchronize at a transition. The ZZT Scanner receives its activating input from the OLC 540 (FIG. 5D) via Bus 593 and sends the Starting Address of the next P-Segment to all PEs via Bus 215.

2. At the entry point to the next P-Segment, the ZZT Frame is cleared and the first Cell in it will be marked with the current (i.e. the zero-th) Level of Conditionality. As each instruction is executed, the following actions take place:

3. If an instruction accesses a register, which is marked as invalid, a FETCH message is sent to the ZZT RFILE, which returns the initialized register value.

4. If an instruction is the conceptually last instruction to modify a register at a given LC, a message is sent via Bus 135 to the Cell in the ZZT Frame for the current LC. Such a message is illustrated in FIG. 6F and carries the following information:

A Fetch/Store Bit 671 indicating FETCH or STORE and a ZZT Access Bit 672. These two bits in combination allow the Memory Hierarchy Interface 145 to distinguish FETCH from the ZZT RFILE from a STORE to the ZZT Frame and from other FETCHES and STORES to the Memory Hierarchy Interface 145.

Register Name 673

Level of Conditionality (LC) 674

When Bit 671 and Bit 672 indicate that a STORE is to be done into the ZZT Frame, the ZZT Frame Entry for the indicated Register in the indicated Cell is modified as follows: For the modified register, the Register Change Bit in the ZZT Cell 641 for the LC 674 and the Register Name 673 is turned on and the new register contents are written into the corresponding position in the Register Values field.

5. If a branch instruction is executed:
   a. The ZZT Cache Directory is checked for a match with the branch address. If a match occurs, the current Z-Code is recorded and a transition to Z-Code takes place.
   b. If a match does not occur, and it is decided that the Z-Code built so far is long enough, then the Z-Code is terminated and a re-entry to E-Mode is initiated.

6. When a BWG in the E-Mode is recognized, a roll back occurs to the LC preceding that of the wrongly guessed branch. By scanning the Cells in the ZZT Frame backwards from that LC, the correct state of all registers can be determined and they are reset to that state. Execution in the E-Mode continues from the correct target.

7. The recording of Z-Code built up involves the following steps:
   a. A new range of Elements in the ZZT Cache Array is selected for the ZZT Cells 641 having a LC equal to or less than LCF.
   b. The Register Change Bits for each LC equal to or less than LCF are copied from the ZZT Frame into the corresponding Element in the ZZT Cache Array.
   c. The End of Segment Bit 633 in each ZZT Array Element 631 is turned off, except for the last cell which is turned on.
   d. Using Age Tags 628, a ZZT Directory Entry 621 in the ZZT Cache may be purged and a new Entry replaces it.

e. In this new ZZT Cache Directory Entry, the beginning address of the P-Segment becomes the Starting Address 622 and the ZZT Cache Address 623 is a pointer to the newly created ZZT Cache Array Elements.
8. At the point of the transition, all registers in all of the PEs are set to be invalid so that any use of a register value by a PE will first require that the value be obtained from the ZZT RFILE.

Usage of ZZT Structures in Z-Mode

During Z-Mode, the ZZT data structures are used as follows:
1. When Z-Mode is entered, the ZZT RFILE contains the valid contents of all registers at the entry point. Initially this is true, as we assume that the ZZT RFILE will be so initialized. Each time Z-Mode is re-entered, the ZZT RFILE is properly reset.
2. When Z-Mode is entered, the ZZT Directory Entry provides the ZZT Cache Address which points to the ZZT Array Elements that are loaded into the ZZT Frame. The End of Segment Bit stops the transfer of information. The ZZT Frame is set from the ZZT Cache Array Elements, which are copied into the ZZT Frame, one for each LC. As each instruction is executed, the following actions take place:
3. If a Z-Instruction accesses a register, which is marked as invalid, via the Valid Bit 310 associated with this register, a FETCH message is sent to the ZZT RFILE which returns the initial register value for the Called Segment.
4. If a Z-Instruction is the conceptually last instruction to modify a register at a given LC, the D-List of the instruction includes the ZZT Frame and the message is routed via the MHS through Bus 460 to the ZZT Frame. The message from the PE identifies the Cell in the ZZT Frame by the LC 674 and the register within the Cell by the Register Name 673 within the message. For the modified register, the corresponding bit in the valid Bits field is turned on and the new register contents are written into the corresponding element in the Register Values field.
5. When a BWG is recognized or when the Z-Code ends, the final state is established by updating the ZZT RFILE. Since the ZZT Scanner awaits all relevant register changes and the OLC agreeing with the LC of the BWG assures that all stores have been posted, the completion of all relevant PE activity is assured.
6. Just before starting another mode, all registers in all processors are set to invalid using the Valid Bit 310.

SECTION 7 ASSIGNMENT OF INSTRUCTIONS TO PROCESSING ELEMENTS IN E-MODE

It is sensible that the assignment to instructions to Processing Elements be combined with the decoding function of a Processing Element since the information derived from decoding the instruction serves as the most meaningful input to the assignment decision. FIG. 7 illustrates the elements of the Decoder/Scheduler 700. The Decoder 701 is either presented with the next Z-Instruction from the Z-Cache 200 via Bus 150 or presented with the next instruction from the Memory Hierarchy 140 via Bus 135. The former occurs in Z-Mode and there is no Scheduler 702 operation required.

In Z-Mode the action of the Decoder 701 is to process the Instruction Image 222, S-List 223, and D-List 224 (FIG. 2C), and send the derived information to the Execution Units 130 and Register File 300, and to the Memory Hicrarchy 140 in the Z-Instruction FETCHES or STORES. In E-Mode the information derived by the Decoder 701 is sent to the Scheduler 702 to determine the assignment of this instruction.

The terminology used in this Section 8 is to call the Assignment Function $\phi$ so that for the p-th instruction of a P-Segment, $\phi(p)$ is the name of the Processing Element to which the p-th instruction is assigned. All Processing Elements are identical with the exception of their unique Processing Element Number, and all use the same $\phi$. Thus no ambiguity arises from the separate evaluations of $\phi(p)$ even if it is done asynchronously on different Processing Elements.

The inputs to the Scheduler 702 are shown in FIG. 7. As discussed earlier, the OSC/PSC Controls 500 use Bus 705 to communicate the ID of the instructions that caused the hazard. This information allows MSIS to restart following an OSC in a manner which assigns all indicated instructions to the same Processing Element, so as to avoid a repetition of the inter-Processing-Element OSC/PSC hazard. Such information is input to the Scheduler 702 and causes it to over-ride the usual $\phi$ decisions.

Another possible input to the Scheduler 702 are External Over-Ride inputs 710. Included in this class of over-rides are:
  A Predefined $\phi$ 711 for each instruction supplied from an external source,
  Specific Rules 712 that control the assignment by partitioning of the registers among Processing Elements, i.e. defining ownership, and
  A P-Segment Starting Address 713 for starting Z-Code generation at a specific instruction and a P-Segment Terminating Address 714 for stopping Z-Code generation at a specific instruction.

All of these can be created and supplied by another processor which analyzes the overall I-Stream in execution, breaks it up into P-Segments, and instructs MSIS using the aforementioned External Over-Ride Inputs 710.

Another over-ride of the usual Scheduler decision for assignment is an Architectural Over-Rides 760. For processor architectures which have elements of machine state that are not maintained in registers, e.g. condition code, a provision in the Scheduler 700 can be made so that the pair of instructions that mutually depend on each other through the setting and using of such an element are perforce scheduled on the same Processing Element.

In the absence of any such relevant input, the instruction will be assigned based In the absence of any such relevant input, the instruction will be assigned based on an Algorithmic Scheduler 740. Any pre-defined algorithm may be used which partitions the code into sequences which are in conceptual sequence with respect to the original program sequence.

In order for the Algorithmic Scheduler to be consistent with Section 8, each Processing Element must maintain a record of the scheduling decision on all Processing Elements at all branch points in the P-Segment. The Scheduler Rollback Controls (SRC) 741 performs this function and it is through SRC that following a roll-back of the schedule, any information needed subsequently by the Scheduler 702 in scheduling decisions is made available. Such a recording is simplified if the assignment function is based on External Over-Ride Inputs or using only those criteria which are evident from the instruction to make the scheduling decision. These criteria include: instruction ID or registers used by the instruction. Algorithmic Schedulers cover a broad range of possibilities. A few simple examples are:

Temporal Scheduling

Consecutive instructions are scheduled on the same Processing Element until some termination criteria is satisfied such as:
 a fixed number of instructions have been scheduled on the same PE, or
 a branch instruction has been taken, or
 a register initiating instruction has been encountered.

The next instruction following the termination is assigned to the next higher numbered Processing Element which is scheduled as specified above. If the Processing Elements are numbered 1 through n, the next higher Processing Element after n is 1.

Spatial Scheduling

This scheduling attempts to reduce messages by determining which registers are set by the instruction to be scheduled and assigning all instructions which set a given register to the same Processing Element. If an instruction sets more than one register and this leads to a scheduling choice between different Processing Element then a pre-defined tie-breaker is used, i.e. $\phi(p)$ is the smallest numbered Processing Element.

The preferred embodiment of the Algorithmic Scheduler is to schedule an instruction based on the scheduled availability of the inputs required by the instruction.

Min-Slot Min-Time Algorithm for Scheduling MSIS

The Min-Slot Min-Time (MSMT) Assignment Algorithm is an example of an assignment algorithm that is driven by the prior assignment of earlier instructions. Since the prior assignments can be called the schedule, MSMT is a schedule oriented assignment in contradistinction to temporal or spatial assignments.

The functional units employed by MSMT are shown in FIG. 78.

1. Register-Slot-Time Availability Table 770 receives the names of the registers used by the instruction to be scheduled and the mode of the register use (i.e., Address Generation AGEN input or Execution EXEC input). The Register-Slot-Time Availability Table maintains for each register the slot time $\tau$ assigned to the last instruction that modified that register. The register names are kept in Register Names Table 771 and the slot times are kept by Slot Times Table 772.

2. The Compute Maximum element 775 uses the Slot Times Table output modified by the usage mode {AGEN, EXEC} and computes the maximum of these times. Compute Maximum sends this time to the Min Slot element 776.

3. Min Slot 776 receives the output of Compute Maximum and send this information to the Compute $[\phi, \tau]$ element 790.

Figure 7B:
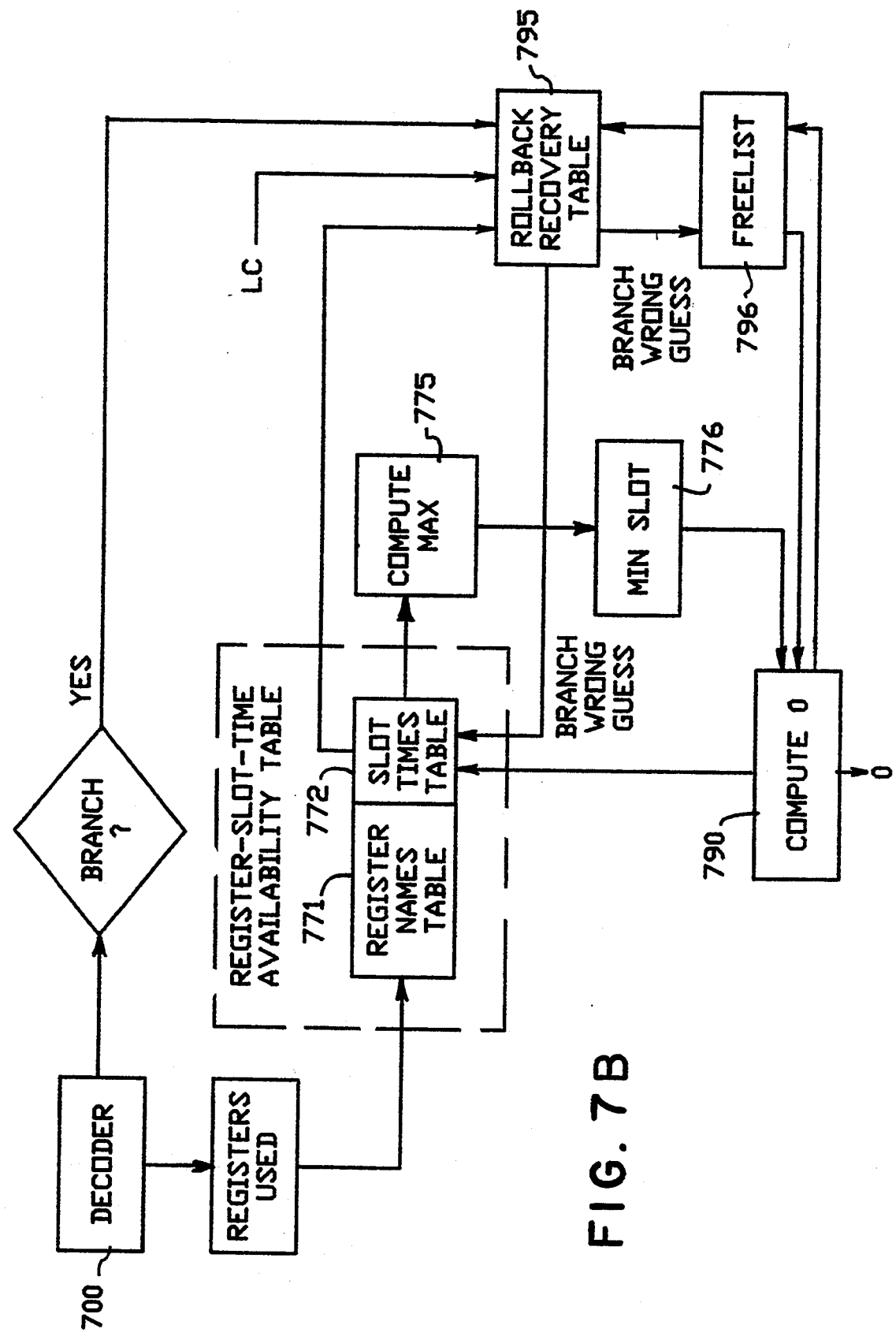
FIG. 7B is a block diagram of apparatus which implements the preferred method of distributing the instructions of an execution sequence in accordance with this invention.

4. Freelist 796 maintains a list of the first available slot on all of the Processing Elements. Note that the structure shown in FIG. 7B is duplicated on all Processing Elements and determines the identical schedule autonomously and asynchronously since the algorithm and inputs are identical at the actual point of assignment. Freelist 796 is the other input to Compute $[\phi, \tau]$ 790.

5. Compute $[\phi, \tau]$ 790 uses Minslot 776 and Freelist 796 to determine the $\phi$, the assignment and the Slot Time $\tau$. The value of the Slot Times Table is changed to $\tau$ for all registers modified by this instruction and the value of Freelist for the Processing Element assigned is altered to $\tau + 1$.

6. The Rollback Recovery Table 795 saves the status of Freelist and the Slot Times Table following the assignment for each Branch instruction using the LC of the Branch. If during the E-Mode, a Branch is guessed wrong, the Rollback Recovery Table restores the Freelist and Slot Times Table that were saved.

MSMT is an exemplar of a class of Monotonic Finite Incremental schedule oriented algorithm that can be implemented in MSIS and have the following characteristics:
 For each instruction, all Processing Elements execute the MSMT algorithm in parallel so as to determine the common assignment of that instruction—the identity of the Processing Element that will execute the instruction in the Z-Mode.
 Based on the assignment, all Processing Elements will update the information that each will need to perform subsequent assignment decisions.
 The {S-List, D-List} that will be needed by the Z-Code is created.
 The instruction is executed in the E-Mode.

Principle Advantages of Monotonic Incremental Schedulers

1. The ability to make an assignment incrementally does not require global information about the program segment being scheduled.
2. The algorithm can have parameters that cause the overall schedule to have a small number of internal holes and a terminal gap between the Z-Codes to be reduced. Such a gap, called "D" limits the performance impact of a Z-Code to Z-Code transition and Branch Wrong Guesses.
3. Such schedulers allow the total schedule length of $Z_1$ followed by $Z_2$ to compare favorably with the schedule length of $Z_1$ composed with $Z_2$.

Analysis of the Goodness of a Schedule

Given a P-Segment with M instructions, each executable in a single cycle, and P Processing Elements, then the optimum schedule will have length approximating M/P. In some processor designs there is a pipeline that accommodates the overlap of instruction processing with memory access. In such a case the length of a schedule on a single Processing Element, P=1, for M instructions can be greater than M due to instruction interdependency. The manifestation of instruction interdependency in an MSIS schedule are gaps between the decode times of instructions that have been assigned consecutively to the same Processing Element. The attempts at minimization of such gaps, called holes, distorts the schedule by allowing one Processing Element to be scheduled to a point far beyond the schedule of other Processing Elements. Instructions dependent on these already scheduled instructions cannot be assigned to other Processing Elements without creating large gaps. The result of pure minimization of holes leads to lopsided schedules with large lengths. The total wasted slots in the schedule is the difference between the product of the length of the schedule L and the number of Processing Elements P and the number of instructions M. This difference is comprised of the number of internal holes, H, and the final unfilled area below the last instruction scheduled on each Processing Element.

The type of schedule oriented assignment characterized by MSMT allows the schedule generated using a simple computational step to balance the contending requirements of the schedule:

minimize total length, and minimize the number of internal holes.

The information needed to perform the assignment decision for each instruction involves:

the last used slot (or pseudo-time) available on each of the processing elements, and the decode time (slot/pseudo-time) of the instructions that last set each of the registers.

Such algorithm can accommodate the details of the pipeline structure that relate decode time to execution time and can to also determine the impact of message delay where the setting of a register is done on one processing element and the use of that register is for an instruction assigned to a different processing element.

Algorithm for Min-Slot Min-Time Schedule

A processing Element maintains the following data structures to compute the schedule. The arrays range over the sets of registers and Processing Elements respectively.

TIME(r)=Decode time of INST(r).

FREE(p)=Last decode time on Processing Element p.

The following function computes the Processing Element assignment and decode time for a given instruction, I, from the arrays TIME and FREE:

For MSMT(TIME,FREE,I)

Compute the following:
1. Let T1=Max{TIME(r)} for all registers r needed to execute I.
2. Let T2=Max{TIME(r)} for all registers r needed to decode I.
3. Let T3=1+Max{T1, 3+T2} (assuming an AGI delay of 3 cycles).
4. Let p=the Processing Element that minimizes ABS(FREE(p)−T3). If more than one Processing Element achieves this minimum, choose the Processing Element among them that minimizes FREE(p).
5. Let t=Max{T3, FREE(p)}.

Return (p,t).

Complex algorithmic scheduling represents a trade-off between complexity of the Scheduler 702 and the performance achieved. Recall that the occurrence of a BWG takes away the performance advantage of scheduling instructions that conceptually follow the branch on other Processing Elements many cycles before the branch is executed.

To maintain consistency with the rest of the embodiment it is necessary that the scheduling done by the Scheduler 702 be one which maintains conceptual sequence within Processing Elements. Multiple instructions can be scheduled in a single assignment operation if the instructions are presented simultaneously to the Scheduler in all Processing Elements. The assignment in such a situation specifies which Processing Element and in which order the instructions scheduled to the same Processing Element are to be ordered in the Z-Cache Array. However, the requirement of conceptual order within each Processing Element removes this degree of freedom.

Following the assignment of an instruction in the E-Mode the instruction is presented to the Assigned Instruction Processing Unit 751 whose operation is described in Section 8 wherein for all non-assigned Processing Elements a notation is made of the impact of this instruction on the validity of registers and a need for messages to be sent, and on the assigned Processing Elements the garnering of inputs from the Register File 300, the Memory Hierarchy 140, and the execution of the instruction through the Execution Units 130.

SECTION 8 INSTRUCTION PROCESSING

Instruction Attributes

The Instruction Identifier (ID) 802 (FIG. 2C) and the Level of Conditionality (LC) 502 (FIG. 2C) for each instruction have already been described. An instruction is also associated with another attribute called BWGID, which is the ID of the latest branch instruction that was guessed wrongly. The pair {BWGID,ID} uniquely identifies an instruction. As an example, suppose instructions 3, 6 and 8 were wrongly guessed branches. Then the instructions 1 thru 10 would have the following identifying pairs: {0,1} {0,2} {0,3} {3,4} {3,5} {3,6} {6,7} {6,8} {8,9} {8,10}.

The advantage of this numbering scheme will become clear when we examine how branch wrong guesses are handled later. For now, we observe that because of pipeline organization, a machine may execute instructions {0,4} {0,5} on the wrong branch path, before the result of the branch instruction {0,3} takes effect. If the machine keeps track of the list of currently known branch wrong guesses (0,3,6,8, . . . in this example), then it is easy to recognize valid instructions. An instruction is valid if its BWGID is present in the above list and its ID is not greater than the next BWGID in the list. Thus, instructions {0,4} {0,5} are invalid in the above example.

Register History—R—Lists

Each PE stores the next needed update to any register owned by other PEs in a Register File 300. The structure and operation of the Register File was described in Section 3 and is shown in FIG. 3. An entry in the Register File 300 is of the form {BWGID,ID,-DATA}. DATA is the contents stored into register r by the instruction {BWGID,ID} and the column position within the Register File identifies the PE that executed this instruction. Sometimes the form {BWGID,ID,?} will be used hereinafter, indicating that instruction {BWGID,ID} will modify the register r, and the actual DATA will be known only in the future. The use of ? is a reference to the invalid value of the cell, that is, the Cell Valid Bit 320 indicates that the those entries marked with a ? are invalid.

Instruction Processing in E-Mode

Initialize all arrays:

TIME(r)=0 for all registers r.

FREE(p)=1 for all Processing Elements p.

In E-Mode, each instruction is seen by every PE. An instruction is actually executed only by the PE assigned to it by $\phi$(ID). A PE, p, takes the following actions to execute an instruction whose attributes are BWGID,ID,LC and which has S and D as its input and output register sets:

For each PE p, do the following:
A. Compute the schedule: $\phi(ID), \tau(ID) = \text{MSMT}(\text{TIME}, \text{FREE}, I)$ and then do the following:
  1. For each register r in D, set $\text{TIME}(r) = \tau(ID)$.
  2. set $\text{FREE}(\phi(ID)) = 1 + \tau(ID)$.
B. IF $\phi(ID) = p$, then do the following:
  1. VALIDATE: For each register r in S,
    a. If R [r,*] is marked as invalid, follow the instructions specified in the portion of Section 6 entitled "Usage of ZZT Structures in Z-Mode". When we enter into E-Mode execution, the ZZT RFILE contains the valid contents of all registers at the entry point. At the point of a transition all registers in all PE are marked invalid and the accessing of any register so set must derive its input from the ZZT RFILE.
    b. Scan the row R [r,*] and find R [r,k] containing {BWGID',ID',DATA}, so that {BWGID',ID'} is the largest tag smaller than {BWGID,ID}.
    c. If k is not p then wait until DATA is not ? and then copy the DATA into R [r,p].
  2. EXECUTE: Based on instruction opcode do the following:
    a. MEMORY FETCH: send request {FETCH,LC,{BWDID,ID},ADDRESS} to the Interface 145 (FIG. 1) and wait until the result is obtained.
    b. MEMORY STORE: send request {STORE,LC,{BWGID,ID},ADDRESS,DATA} to the Interface 145.
    c. BRANCH: send message {BDONE,LC,{BWGID,ID}} via Bus 890 to Pruning Monitor 542. When a BWG, in the E-Mode, is recognized, a roll back occurs to the LC preceding that of the offending branch. By scanning the elements in the ZZT Frame backwards from that LC, the correct state of all registers can be determined and they are reset to that state. Execution in the E-Mode continues from the correct target. If the branch has been guessed wrong, then send the message {BWG,LC,{BWGID,ID},CORRECT-TARGET-ADDRESS} via Bus 890 to Pruning Monitor 542.
    d. OTHER: perform the appropriate logic.
  3. RECORD: Store results (if any) into the destination registers. For each register r in D, replace R [r,p] by {BWGID,ID,DATA}.
  If a branch instruction is executed, the ZZT Cache Directory is checked for a match with the branch address. If a match occurs, the current Z-Code is recorded and a transition to Z-Code takes place.
  4. If a match does not occur, and it is decided that the Z-Code built so far is long enough, then the Z-Segment is terminated and a re-entry to E-Mode is initiated.
C. IF $\phi(ID)$ is not p, then do the following:
  1. SEND: For each register r in S,
    a. Scan the row R [r,*] and find the item R [r,k] = {BWGID',ID',DATA} having the highest {BWGID',ID'} smaller than {BWGID,ID}.
    b. If k=p and {r,BWGID',ID',$\phi(ID)$} is not in the D-list of instruction {BWGID',ID'}, then do:
      1) Send message {r,DATA,BWGID',ID'} to processor $\phi(ID)$.
      2) Enter {r,BWGID',ID',$\phi(ID)$} into the D-List of instruction {BWGID',ID'}.
      3) Enter {r,BWGID',ID'} into the S-list of instruction {BWGID,ID}.
  2. RECEIVE: For each register r in D, if the Cell Valid Bit 320 of R [r, $\phi(ID)$] is not is not ? then replace R [r, $\phi(ID)$] with {BWGID,ID,?}. The ability of the MHS to anticipate the future need by a PE of a message is a result of the fact that in the E-Mode all PE see all instructions and the PE operate asynchronously. If a message arrives early with respect to the }BWIG, ID} of a given PE, this means that this message is the earliest message from the sending PE that is required by the PE and that any intermediate modifications to this register by that PE need not be recorded.
D. If the instruction is a branch, it is necessary to determine for each register r, which instruction last changes the value of the register at the LC of the branch. The means of doing this parallels the determination of the PE that has last set the value of a register that it must send a message to the PE that is assigned an instruction if another PE has been assigned that instruction. The LC need not be manifest as the algorithm will not send a second message to the ZZT Frame if the ZZT message is already on the D-List of the instruction.
If the instruction decoded is a branch, then for each PE p,
  1. SEND: For all registers r
    a. Scan the row R [r,*] and find the item R [r,k] = {BWGID',ID',DATA} having the highest {BWGID',ID'} smaller than {BWGID,ID} of the branch.
    b. If k=p and {r,BWGID',ID',ZZT Frame)} is not in the D-list of instruction {BWGID',ID'}, then do:
      1) Send message {r,DATA,BWGID',ID','LC of the branch'} to the ZZT Frame via Bus 110 to the Memory Hierarchy 140. The message will be sent as a ZZT STORE ACCESS as described in Section 6 in the part entitled "Usage of ZZT Structures in E-Mode".
      2) Enter {r,BWGID',ID',ZZT Frame)} into the D-list of instruction {BWGID',ID'}.

Instruction Processing in Z-Mode

In Z-Mode, each instruction is seen only by its assigned processor. A processor, p, takes the following actions to execute an instruction whose attributes are BWGID,ID,LC and which has S and D as its input and output register sets and S-list and D-list from the Z-Code:
  1. SYNCHRONIZE: For each item {r,BWGID',ID'} in its S-list, do:
    a. If the register is marked as invalid,
    b. If a Z-Instruction accesses a register, which is marked as invalid, via the Valid Bit 310 associated with this register, a FETCH message is sent to the ZZT RFILE which returns the initial register value for the Called Segment. The values in the ZZT RFILE are established at a transition as described in Section 6.
    c. Wait until R [r, $\phi(ID)$] = {BWGID',ID',DATA} with DATA not equal to ?

d. Load DATA into R [r,p], mark R [r,φ(ID)] as empty (ie. ?. ?) and signal the Message Handling System to send the next message for this entry.

2. EXECUTE: Based on instruction opcode do the following:
   a. MEMORY FETCH: send request {FETCH,LC,{BWDID,ID},ADDRESS} to the OSC Controls 500 and wait until the result is obtained.
   b. MEMORY STORE: send request {STORE,LC,{BWGID,ID}, ADDRESS,DATA} to the OSC Controls 500.
   c. BRANCH: send message {BDONE,LC,{BWGID,ID}} via Bus 890 to Pruning Monitor 542.

When a BWG is recognized or when the Z-Code ends, the final state is established by updating the ZZT RFILE. As the ZZT Scanner awaits all relevant register changes and the OLC agreeing with the LC of the BWG assures that all stores have been posted, the completion of all relevant PE activity is assured.

If the branch has been guessed wrong, then send the message {BWG,LC,{BWGID,ID},CORRECT-TARGET-ADDRESS} to the ZZT.

d. OTHER: perform the appropriate logic.

3. COMMUNICATE: Store results (if any) into the destination registers. When a BWG is recognized or when the Z-Code ends, the final state is established by updating the ZZT RFILE. As the ZZT Scanner awaits all relevant register changes and the OLC agreeing with the LC of the BWG assures that all stores have been posted, the completion of all relevant PE activity is assured.

4. Just before starting another mode, all registers in all processors are set to invalid using the Valid Bit 310. For each item {r,q} in its D-list, send the message {r,DATA,BWGID,ID} to the processor q.

Processor Actions for Asynchronous Inputs

1. When a message is received for R [r,k] just replace its contents with the message.

SECTION 9 EXTENSIONS TO THE BASIC EMBODIMENT

Multiple instructions can be scheduled in single assignment operation if the instructions are presented simultaneously to the Decoder 700 in all Processing Elements. The assignment in such a situation specifies which Processing Element and in which order the instructions scheduled to the same element are to be ordered in the Z-Cache Arrays.

Although MSMT was embodied as an exemplar of Monotonic Finite Incremental schedule oriented assignment algorithms, two additional algorithms are described here as extensions.

Algorithm for Min-Slot Min-P Schedule

The data structures TIME and FREE are the same as before. The following function computes the processor assignment and decode time for a given instruction, I, from the arrays TIME and FREE: For MSMP(TIME,FREE,I)

Compute the following
1. Let T1=Max {TIME(r)} for all registers r needed to execute I.
2. Let T2=Max {TIME(r)} for all registers r needed to decode I.
3. Let T3=1+Max {T1, 3+T2} (assuming an AGI delay of 3 cycles).
4. Let p=the processor that minimizes ABS(FREE(p) −T3). If more than one processor achieves this minimum, choose the processor among them that has the lowest processor number.
5. Let t=Max {T3, FREE(p)}.

Return (p,t).

Algorithm for Min-Slot Min-Contour Schedule

The data structures TIME and FREE are the same as before. This algorithm is parameterized by two numbers as defined below:

TOLERANCE: amount of time a processor can idle in one stretch.

VIOLATION-LIMIT: number of processors permitted to exceed the above tolerance limit.

The following function computes the processor assignment and decode time for a given instruction, I, from the arrays TIME and FREE:

For MSMC(TIME,FREE,I)

Compute the following:
1. Let T1=Max {TIME(r)} for all registers r needed to execute I.
2. Let T2=Max {TIME(r)} for all registers r needed to decode I.
3. Let T3=1+Max {T1, 3+T2} (assuming an AGI delay of 3 cycles).
4. Let PMAX=the least p that minimizes FREE(p).
5. Let FMAX=Max {FREE(p)} for all processors p.
6. Let VIOLATIONS=number of processors, p, with ABS(FREE(p) −FMAX) >TOLERANCE.
7. Let p=if ABS(T3−FMAX)≦=TOLERANCE OR VIOLATIONS< VIOLATION-LIMIT, then PMAX else choose p that minimizes ABS(FREE(p) −T3) and break any ties selecting minimum FREE(p).
8. Let t=Max {T3, FREE(p)}.

Return (p,t).

While the invention has been described in terms of a single preferred embodiment, those skilled in the art will recognize that the invention can be practiced with modification within the spirit and scope of the appended claims.

What is claimed is:

1. In a computer system having a plurality of processing elements, each capable of individually decoding and executing any instruction in a common instruction set, accessing common information stored in a set of registers as input values for instructions and storing output values of instructions to said registers, an apparatus for partitioning a sequential instruction stream of machine executable code into a plurality of instruction subsequences of machine executable code for parallel execution on said processing elements, comprising:

processing element availability means for determining availability times when each of said processing elements is expected to be available to decode an additional instruction not already assigned for execution on a processing element;

input identification means for determining which of said input values are needed for decoding and for executing a next sequential instruction in said instruction stream;

input availability means, coupled to said input identification means, for determining times when each of said needed input values is expected to be available for use by said next instruction;

decode time means, coupled to said input availability means, for determining an earliest time when said next instruction could be scheduled for decoding and still have all of said needed input values available when needed for decoding and executing said next instruction;

pseudo-scheduler means, coupled to said processing element availability means and said decode time means, for assigning said next instruction to one of said instruction subsequences using a criterion which is only a function of said availability times and said earliest time; and, distribution means, coupled to said pseudo-scheduler means, for distributing said instruction subsequences to said respective processing elements but without data indicative of any of said availability times or said earliest times.

2. Apparatus as defined in claim 1 and further comprising:

means for repeatedly inputting assignment decisions from said pseudo-scheduler means to said processing element availability means, said processing element availability means responding to each inputted assignment decision by determining a new availability time when the processing element on which said next instruction has been assigned for execution is expected to be available to decode an additional instruction, until all instructions in said sequential instruction stream have been assigned.

3. Apparatus as defined in claim 2 wherein said criterion results in assigning said next instruction for decoding and execution on said processing element which has an availability time determined by said processing element availability means which is most closely equal to the earliest time determined by said decode time means.

4. Apparatus as defined in claim 3 wherein a tie in applying said criterion is resolved in favor of assigning said next instruction for decoding and execution on said processing element which has the availability time determined by said processing element availability means which is the earliest.

* * * * *